(12) United States Patent
Lee et al.

(10) Patent No.: US 10,146,286 B2
(45) Date of Patent: Dec. 4, 2018

(54) DYNAMICALLY UPDATING A POWER MANAGEMENT POLICY OF A PROCESSOR

(71) Applicant: Intel Corporation, Santa Clara, CA (US)

(72) Inventors: Victor W. Lee, Santa Clara, CA (US); Yuxin Bai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 14/995,263

(22) Filed: Jan. 14, 2016

(65) Prior Publication Data
US 2017/0205863 A1 Jul. 20, 2017

(51) Int. Cl.
| G06F 1/00 | (2006.01) |
|---|---|
| G06F 1/28 | (2006.01) |
| G06N 99/00 | (2010.01) |
| G06F 1/32 | (2006.01) |
| G06F 1/30 | (2006.01) |

(52) U.S. Cl.
CPC .............. G06F 1/28 (2013.01); G06F 1/324 (2013.01); G06F 1/3206 (2013.01); G06F 1/3296 (2013.01); G06N 99/005 (2013.01); G06F 1/30 (2013.01); Y02D 10/124 (2018.01); Y02D 10/126 (2018.01); Y02D 10/172 (2018.01)

(58) Field of Classification Search
CPC ....................................................... G06F 1/30
USPC ....................................................... 713/340
See application file for complete search history.

(56) References Cited

U.S. PATENT DOCUMENTS

| 5,163,153 A | 11/1992 | Cole et al. |
|---|---|---|
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |

(Continued)

FOREIGN PATENT DOCUMENTS

EP   1 282 030 A1   5/2003

OTHER PUBLICATIONS

International Searching Authority, "Notification of Transmittal of the International Search Report and the Written Opinion of the International Searching Authority," dated Mar. 17, 2017, in International application No. PCT/US2016/064272.

(Continued)

*Primary Examiner* — Jaweed A Abbaszadeh
*Assistant Examiner* — Volvick Derose
(74) *Attorney, Agent, or Firm* — Trop, Pruner & Hu, P.C.

(57) ABSTRACT

In one embodiment, A processor includes a logic to receive performance monitoring information from at least some of a plurality of cores and determine, according to a power management model, a performance state for one or more of the plurality of cores based on the performance monitoring information, and a second logic to receive the performance monitoring information and dynamically update the power management model according to a reinforcement learning process. Other embodiments are described and claimed.

20 Claims, 24 Drawing Sheets

(56) References Cited

U.S. PATENT DOCUMENTS

| | | |
|---|---|---|
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 7,992,015 B2 * | 8/2011 | Verdun ............... G06F 1/3203 713/300 |
| 8,671,413 B2 * | 3/2014 | Garash ............... G06F 1/3203 709/223 |
| 8,924,975 B2 * | 12/2014 | Memik ............... G06F 9/4843 702/186 |
| 9,304,573 B2 * | 4/2016 | Lee ............... G06F 1/3296 |
| 9,774,614 B2 * | 9/2017 | Patne ............... H04L 63/1416 |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0208463 A1 * | 9/2007 | Bartley ............... G06F 1/26 700/291 |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0201591 A1 * | 8/2008 | Hu ............... G06F 1/3203 713/323 |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0107166 A1 * | 4/2010 | Topaloglu ............... G06F 9/5094 718/102 |
| 2010/0115309 A1 | 5/2010 | Carvalho et al. |
| 2010/0146513 A1 | 6/2010 | Song |
| 2010/0191997 A1 * | 7/2010 | Dodeja ............... G06F 1/3225 713/323 |
| 2010/0268912 A1 | 10/2010 | Conte et al. |
| 2011/0154090 A1 | 6/2011 | Dixon et al. |
| 2012/0079290 A1 | 3/2012 | Kumar |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0179706 A1 | 7/2013 | Sistla et al. |
| 2013/0346774 A1 | 12/2013 | Bhandaru et al. |
| 2014/0068290 A1 | 3/2014 | Bhandaru et al. |
| 2014/0156225 A1 * | 6/2014 | Dagnino ............ G05B 23/0283 702/183 |
| 2014/0189386 A1 * | 7/2014 | Swarna ............... G06F 1/3296 713/320 |
| 2014/0195829 A1 | 7/2014 | Bhandaru et al. |
| 2014/0208141 A1 | 7/2014 | Bhandaru et al. |
| 2014/0380076 A1 * | 12/2014 | Weissmann ............ G06F 1/324 713/323 |
| 2015/0046685 A1 | 2/2015 | Park et al. |
| 2015/0095009 A1 | 4/2015 | Brock et al. |
| 2015/0177824 A1 * | 6/2015 | Ganpule ............... G06F 1/3296 713/322 |
| 2015/0253826 A1 * | 9/2015 | de la Cropte de Chanterac ......... G06F 1/3228 713/300 |
| 2016/0142054 A1 * | 5/2016 | Mojumder ............ G06F 1/3206 327/333 |
| 2016/0179162 A1 * | 6/2016 | Eastep ............... G06F 1/3203 713/320 |
| 2016/0239074 A1 * | 8/2016 | Lee ............... G06F 1/3225 |
| 2017/0031430 A1 * | 2/2017 | Ansorregui ........... G06F 1/3203 |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

U.S. Appl. No. 14/621,731, filed Feb. 13, 2015, entitled "Performing Power Management in a Multicore Processor," by Victor W. Lee, et al.. (3296).

U.S. Appl. No. 14/621,709, filed Feb. 13, 2015, entitled "Peforming Power Management in a Multicore Processor," by Victor W. Lee, et al. (3301).

(56) References Cited

OTHER PUBLICATIONS

Martin Allen, et al., "Reinforcement Learning with Adaptive Kanerva Coding for Xpilot Game AI," Jun. 5-8, 2011, 8 pages.
wikipedia.org, "Reinforcement Learning," https://en.wikipedia.org/wiki/Reinforcement_learning, accessed Dec. 21, 2015, 12 pages.
Wikipedia, "Machine Learning", https://en.wikipedia.org/w/index.phptitle=Machine_learning&oldid=699478199, revision of Jan. 12, 2016, 12 pages.

\* cited by examiner

DYNAMICALLY UPDATING A POWER MANAGEMENT POLICY OF A PROCESSOR

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

Energy and power efficiency are key issues in computer systems, from small portable devices to large data centers. However, many modern processors are typically optimized for performance and inefficiency in energy/power control is less addressed. In modern processors, power management is often performed by special controller. This controller uses a model to evaluate system inputs such as performance events to make a decision as to power state for the processor. The power management model can be either analytical or statistical, but is typically static and requires a priori knowledge of a system. The model is developed during design stage and is not changeable after shipment. In order for the model to work well across a wide range of applications, the model is set conservatively, and thus is not optimal in many situations.

DETAILED DESCRIPTION

Figure 1:
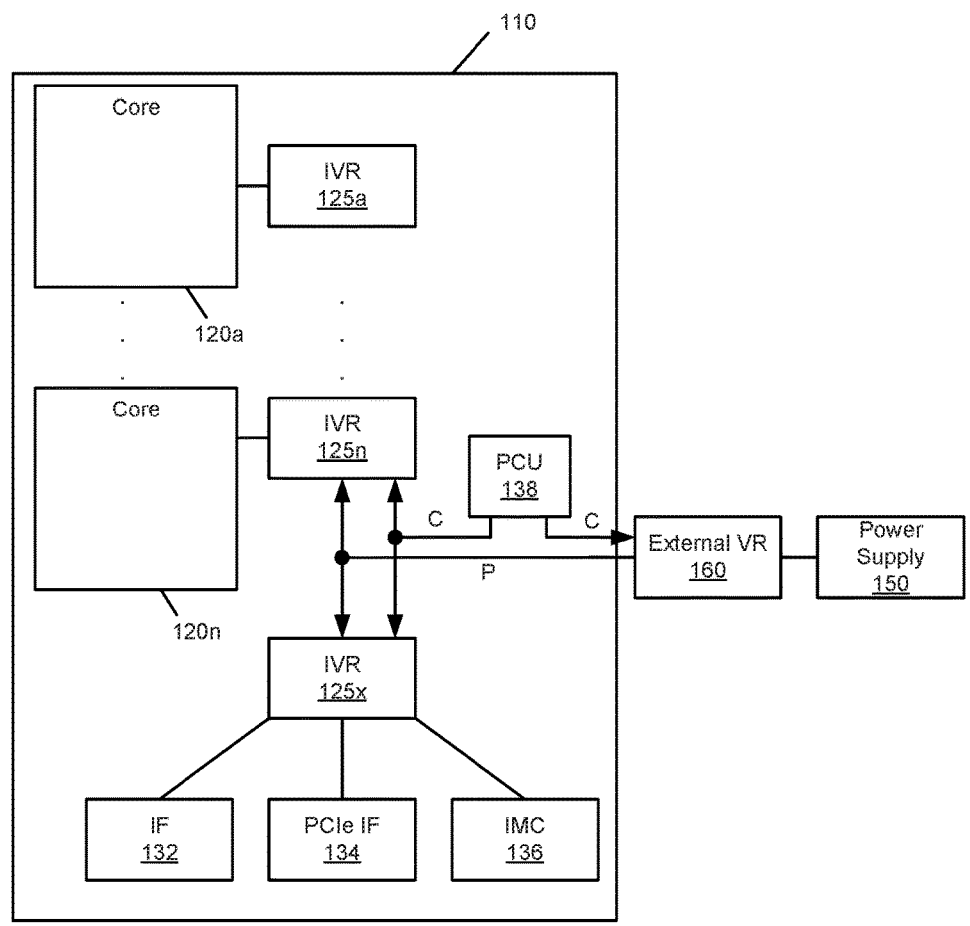
FIG. 1 is a block diagram of a portion of a system in accordance with an embodiment of the present invention.

In various embodiments, an intelligent multi-core power management controller for a processor is provided that learns workload characteristics on-the-fly and dynamically adjusts power configurations to provide optimal performance per energy. In one embodiment, such power configurations include the number of active cores and threads, as well as an optimal voltage and frequency for each active core. In various embodiments, a machine learning-based performance and energy model identifies particular workload behaviors such as intensive memory accesses and predicts optimal power control, including placing one or more cores into an idle or low power state while saturating memory resources.

In an embodiment, a power management controller is configured with a policy that determines an optimal power configuration and a mechanism to apply the decided configuration to the underlying system. Such policies may include heuristics developed by experts, and/or offline/online machine learning schemes, and may further include a number of user-level and operating system (OS)-level core-to-thread management mechanisms.

In various embodiments, a power management model of a power controller of a processor can be dynamically updated, e.g., after the processor has been put into service in the field. In this way, balancing of power management and performance can be dynamically tuned for given workloads/applications to execute on the processor. In various embodiments, reinforcement learning algorithms can be used to dynamically (online) update the power management model.

This reinforcement learning (RL) implementation may be a portable, adaptive and model-free RL approach to evolve an optimal policy for an arbitrary system and workloads at runtime, e.g., to minimize the overall energy consumption under a parameterized performance constraint.

A power management controller as described herein may be configured to allocate only needed resources to a workload, so that performance and energy efficiency can be maximized. As an example, memory bound workloads saturate memory resources (such as bandwidth or queues) before all compute resources are fully utilized. If such workloads are executed with all threads and cores active, poor efficiency will result. Some compute bound workloads also suffer from compromised scalability due to various reasons such as increased synchronization overhead. Embodiments apply to equally to other workloads that create slack in a core, such that the core becomes underutilized. Other example workloads include I/O or network bounded workloads. Embodiments may thus identify a best power configuration for different workloads. For example, particular workloads may be identified and underutilized resources for the workloads can be powered off or operate at reduced consumption levels to enable significant energy savings without adversely affecting performance.

In an embodiment, the best power configuration for a workload defines the optimal number of threads and cores, execution units, voltages and frequencies, and so forth. This power configuration depends on many parameters, including both runtime workload behaviors and system power status. In addition, when considering the overheads incurred during transitions between power states, the selection process becomes even more complex. A single, fixed control policy is hard to adapt to various workloads and different systems. Embodiments thus provide a set of different models to evaluate, and an intelligent selector chooses from the identified models. This enables multiple control policies and a flexible selection at runtime. Thus embodiments may be used to determine an optimal power configuration (e.g., number of cores/threads, and voltage/frequency) concurrently for each workload, rather than a predefined control policy based on a single performance/energy prediction model.

Embodiments operate to save energy without adversely affecting performance for memory-intensive workloads, which saturate memory resources before fully utilizing compute resources, which can waste energy in a multicore processor. Embodiments may identify such behaviors and turn off underutilized cores to provide energy savings without a performance sacrifice.

In some embodiments, a heterogeneous multiprocessor may include two different types of cores: one core type optimized for computation and another core type optimized for memory accesses. In one example, both types of cores implement the same instruction set architecture (ISA) but have different microarchitectures, which may facilitate thread migration between the core types.

Compute and memory bounded phases of a program may have very different processor requirements that cannot be optimized by a single core type. For example, a homogeneous multiprocessor optimized for compute workloads may target for a highest core count running at a frequency that can sustain one fused multiply add (FMA) per cycle per core. However, this multiprocessor may not be very energy efficient during a program phase that is mostly waiting for memory return. This is so, as during memory bounded phases, the cores are mostly idle waiting for memory accesses, yet the idle time may not be long enough to warrant placing the core into a low power state. As a result, the idling core at a high frequency can consume unnecessary power.

As such, embodiments provide a heterogeneous multiprocessor that includes two or more specialized core types that are optimized for different operating points. In the examples described herein, two core types, a compute-optimized core (also referred to as a compute-biased core) and a memory-optimized core (also referred to as a memory-biased core) are provided. However understand the scope of the present invention is not limited to 2 core types, and in other cases additional core types optimized for other workload types may be present.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software). As described further herein, PCU 138 may include control logic to perform a workload classification based on a type of workload being executed, and cause the workload to be executed on a potentially different number of cores (and at potentially different performance states) based at least in part on the workload type.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
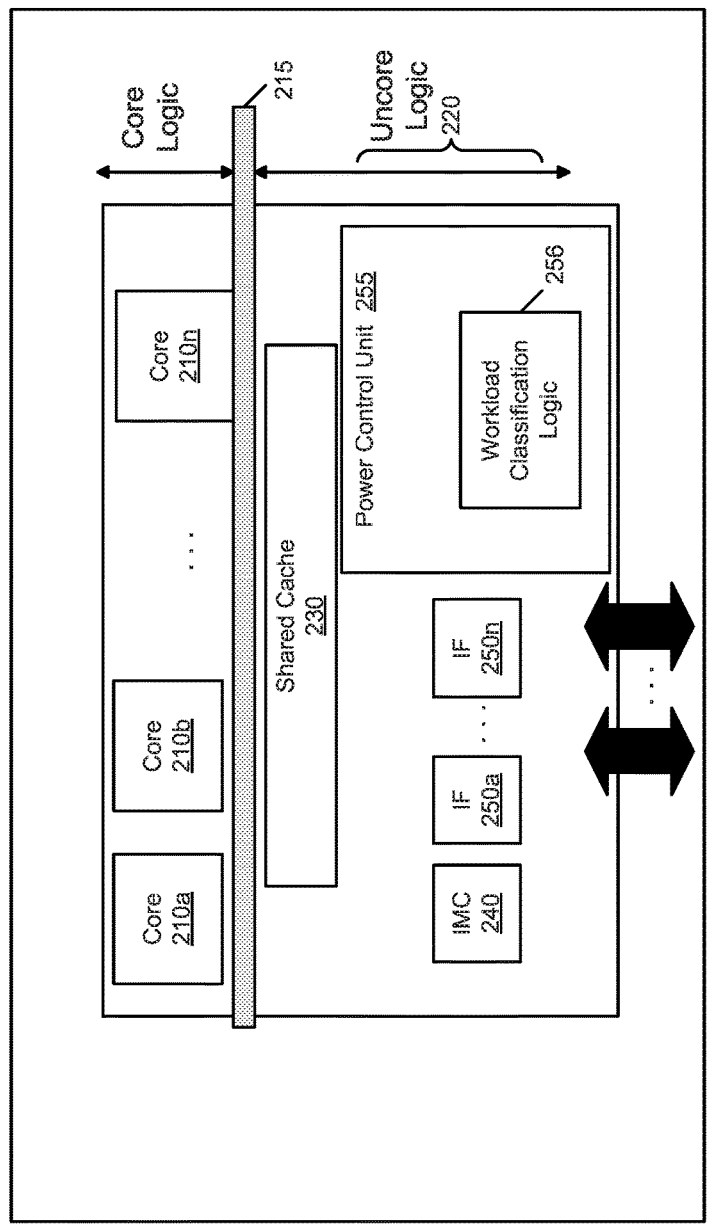
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include a workload classification logic 256 (that may include or be associated with machine learning logic) to classify a workload being executed and perform dynamic control of a number of cores and/or performance state based at least in part thereon, as described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
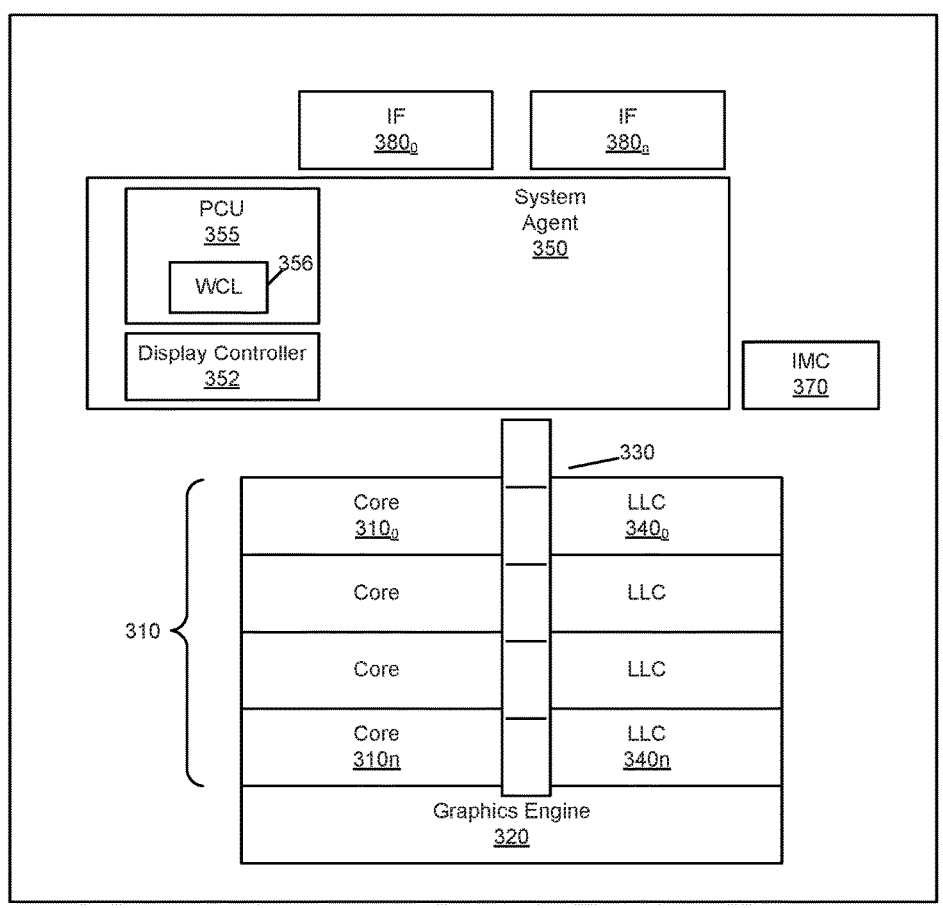
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include a workload classification logic 356 (itself including machine learning logic) to perform the workload classification-based thread migration and power control techniques as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
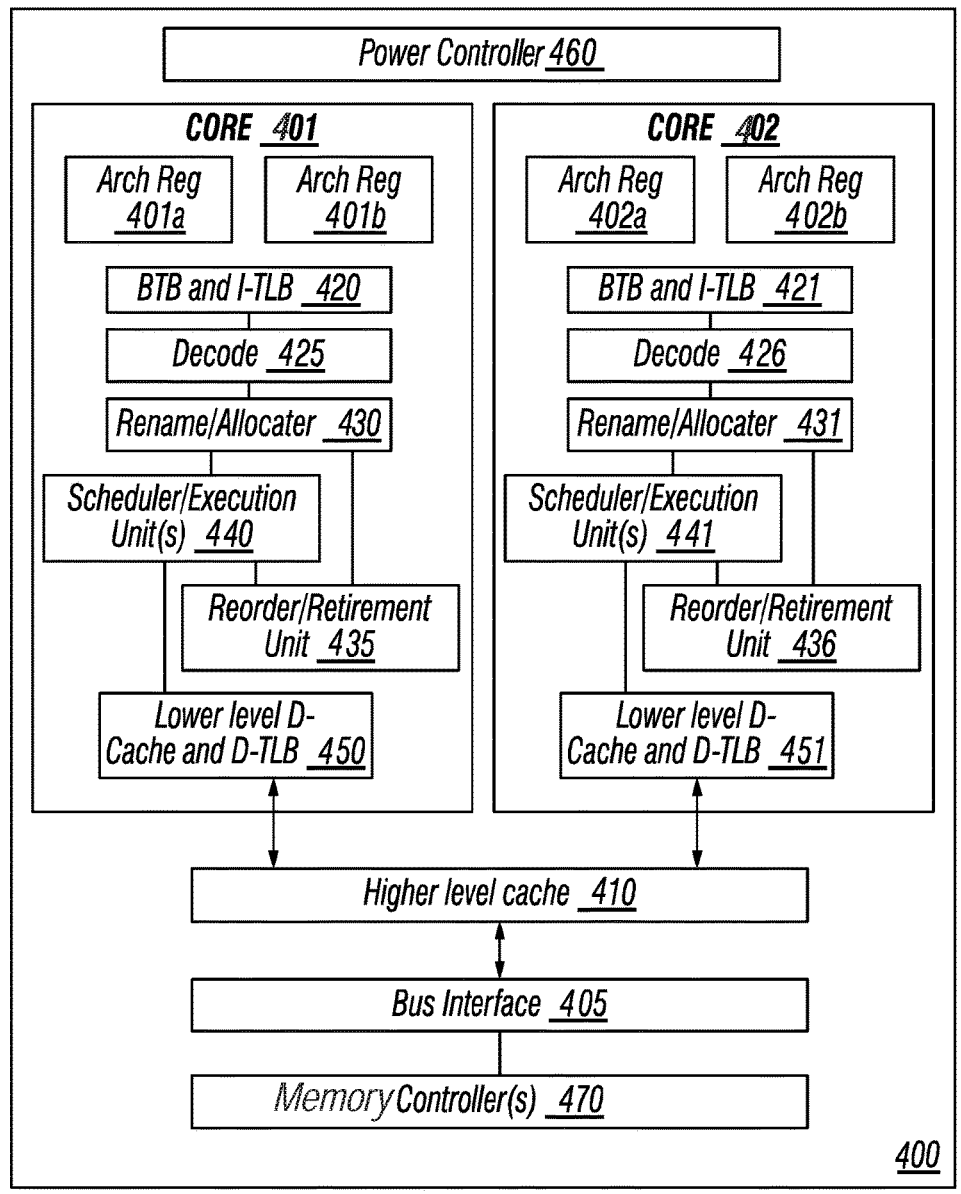
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401*a*, a second thread is associated with architecture state registers 401*b*, a third thread may be associated with architecture state registers 402*a*, and a fourth thread may be associated with architecture state registers 402*b*. Here, each of the architecture state registers (401*a*, 401*b*, 402*a*, and 402*b*) may be referred to as processing elements, thread slots, or thread units, as described above. As illustrated, architecture state registers 401*a* are replicated in architecture state registers 401*b*, so individual architecture states/contexts are capable of being stored for logical processor 401*a* and logical processor 401*b*. In core 401, other smaller resources, such as instruction pointers and renaming logic in allocator and renamer block 430 may also be replicated for threads 401*a* and 401*b*. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
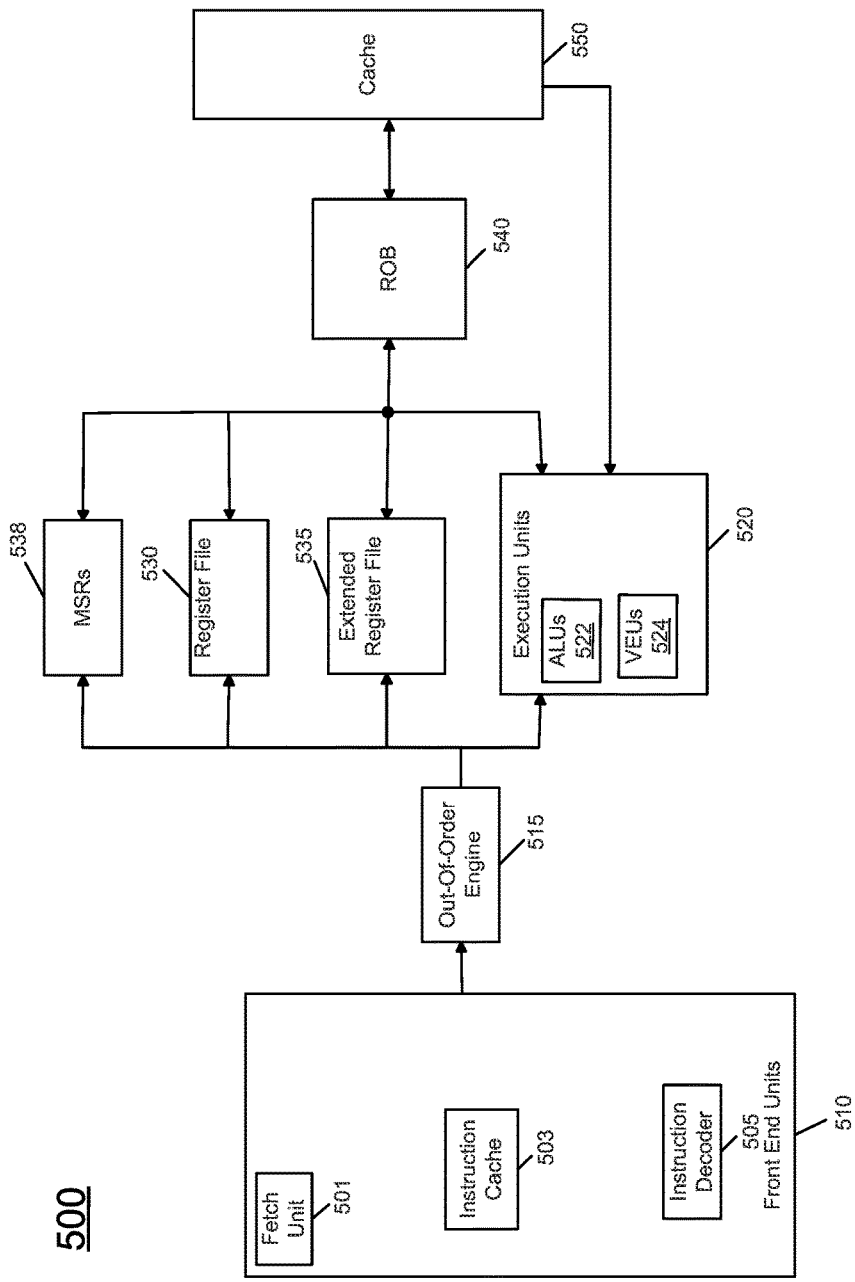
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core). For example, power limit information may be stored in one or more MSR and be dynamically updated as described herein.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
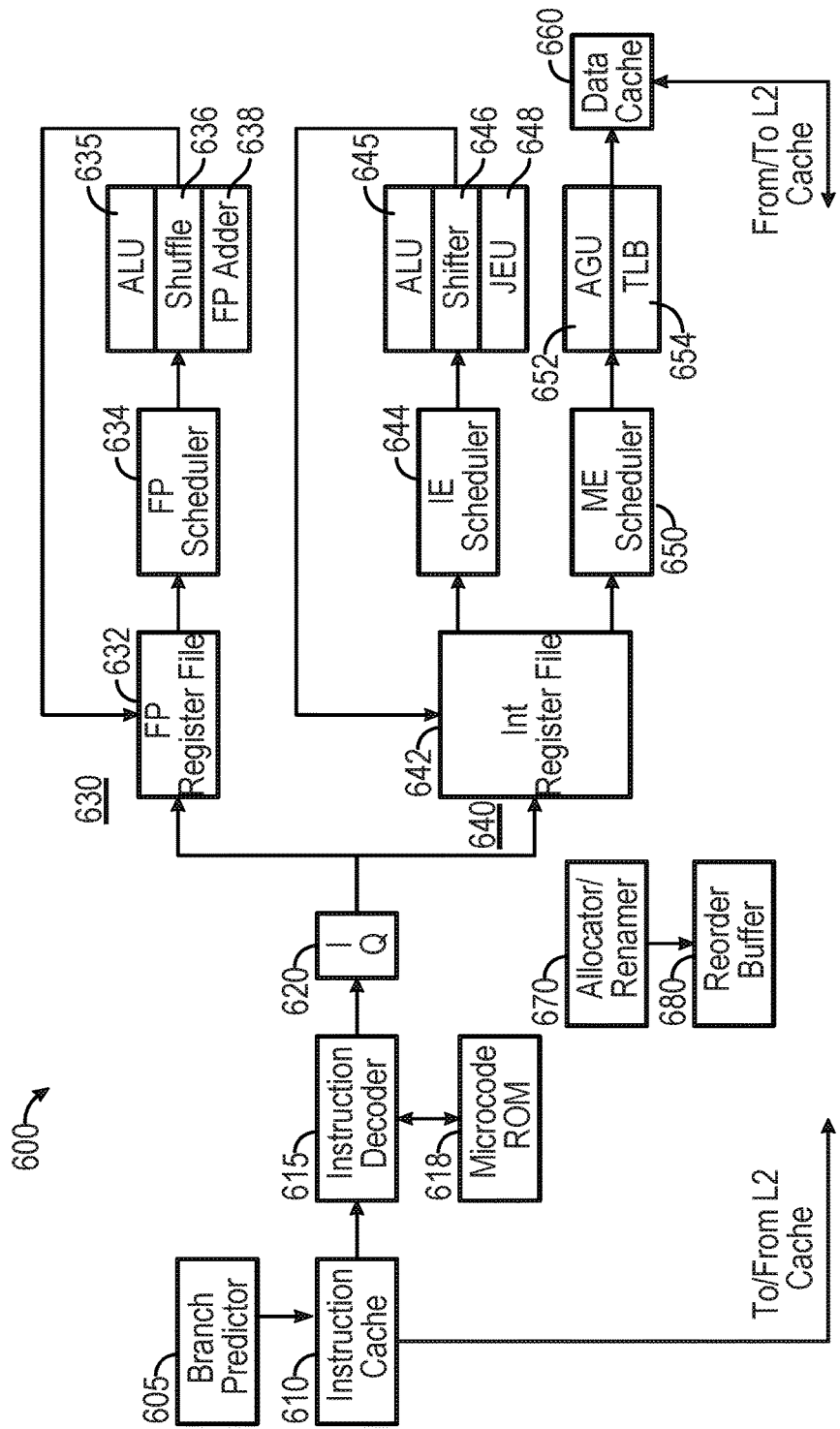
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
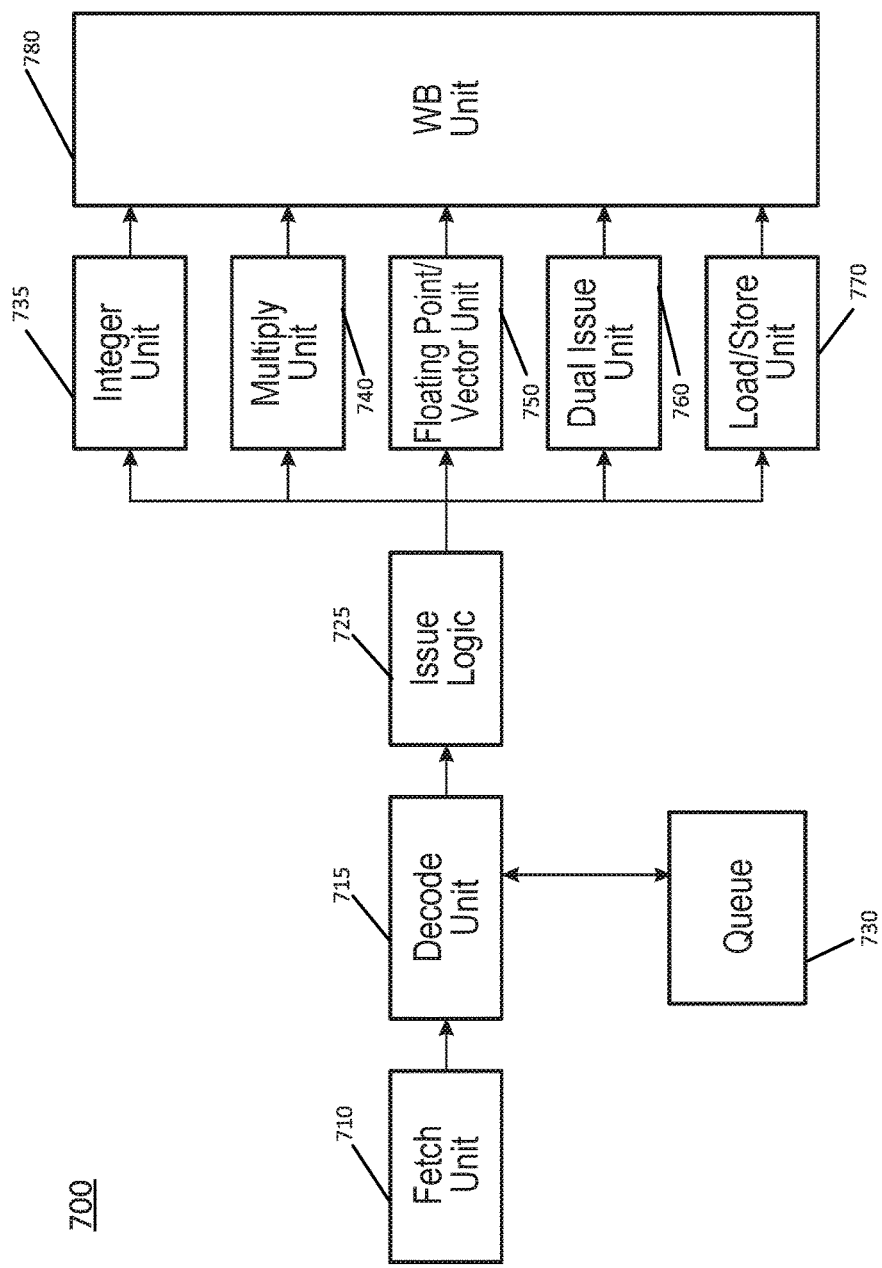
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
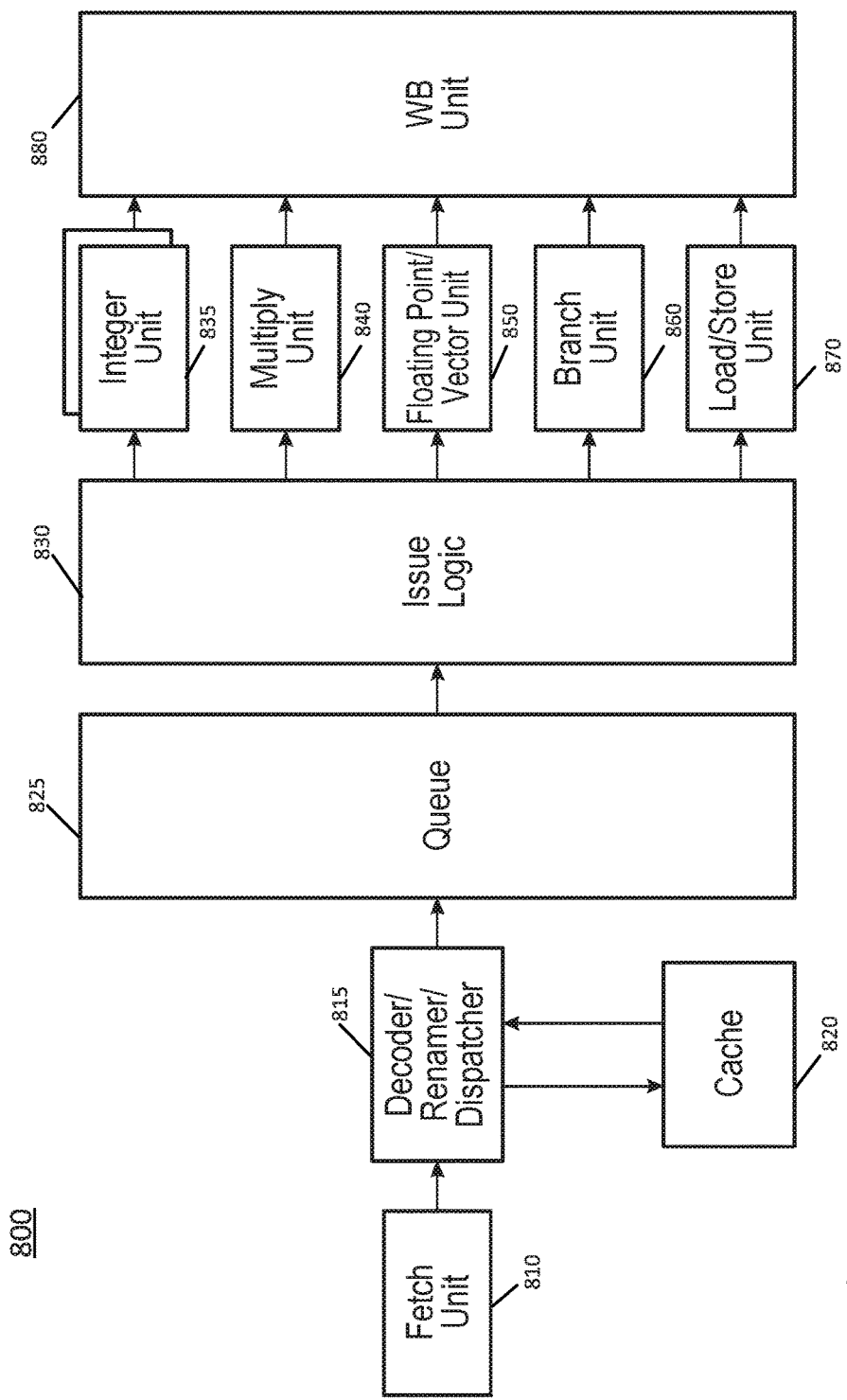
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
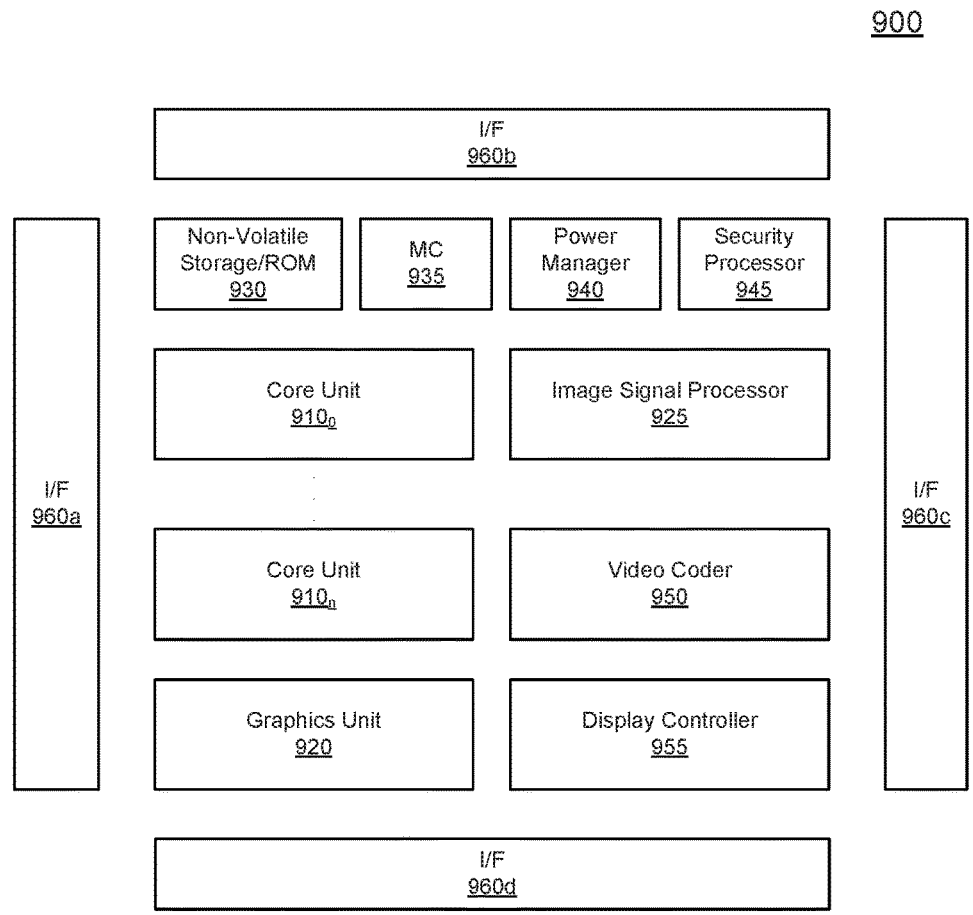
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein. For example, power manager 940 may include a machine learning/workload classification logic to classify a workload being executed and migration logic, which may cause at least some threads of the workload to be dynamically migrated to different cores (and/or core types), such that a different number of cores may be active in a next operating interval.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
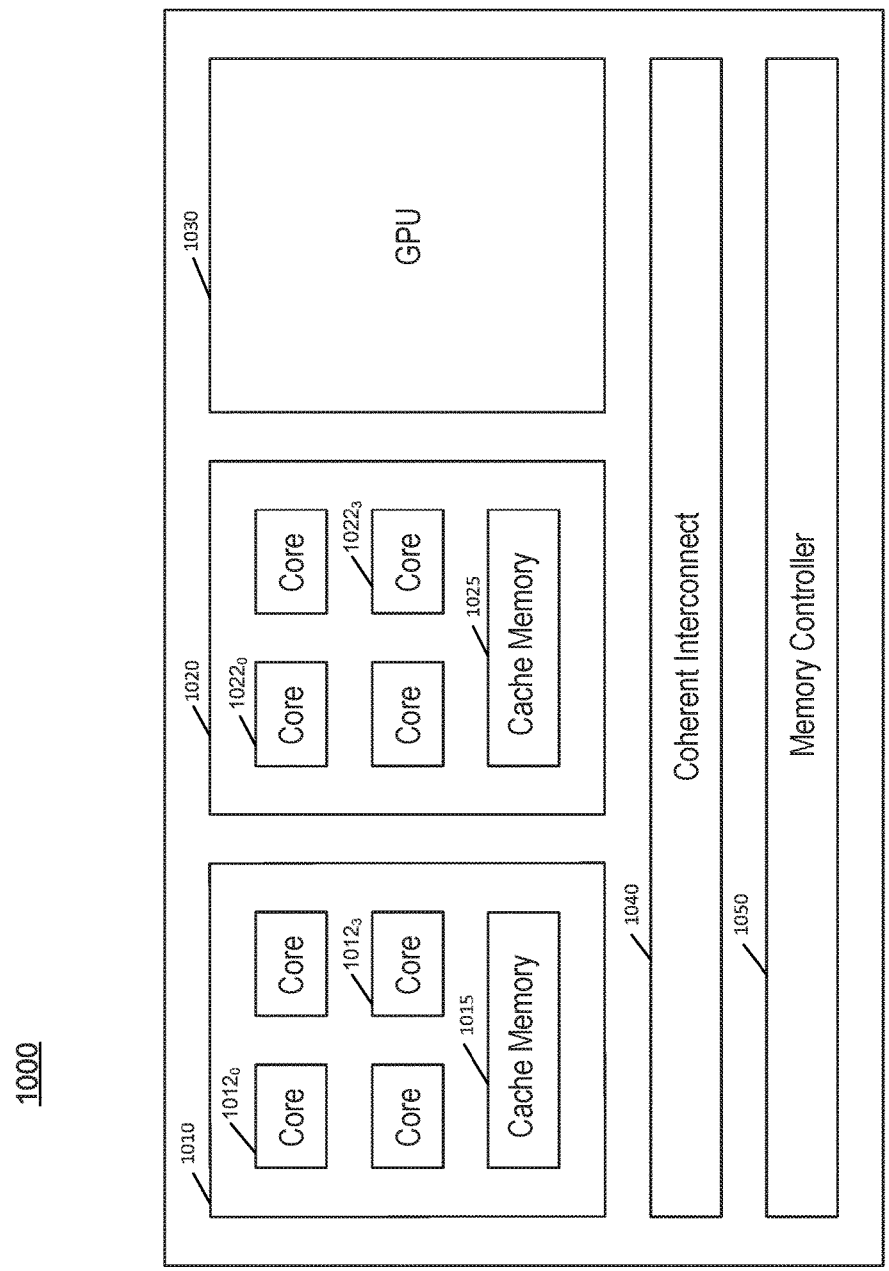
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
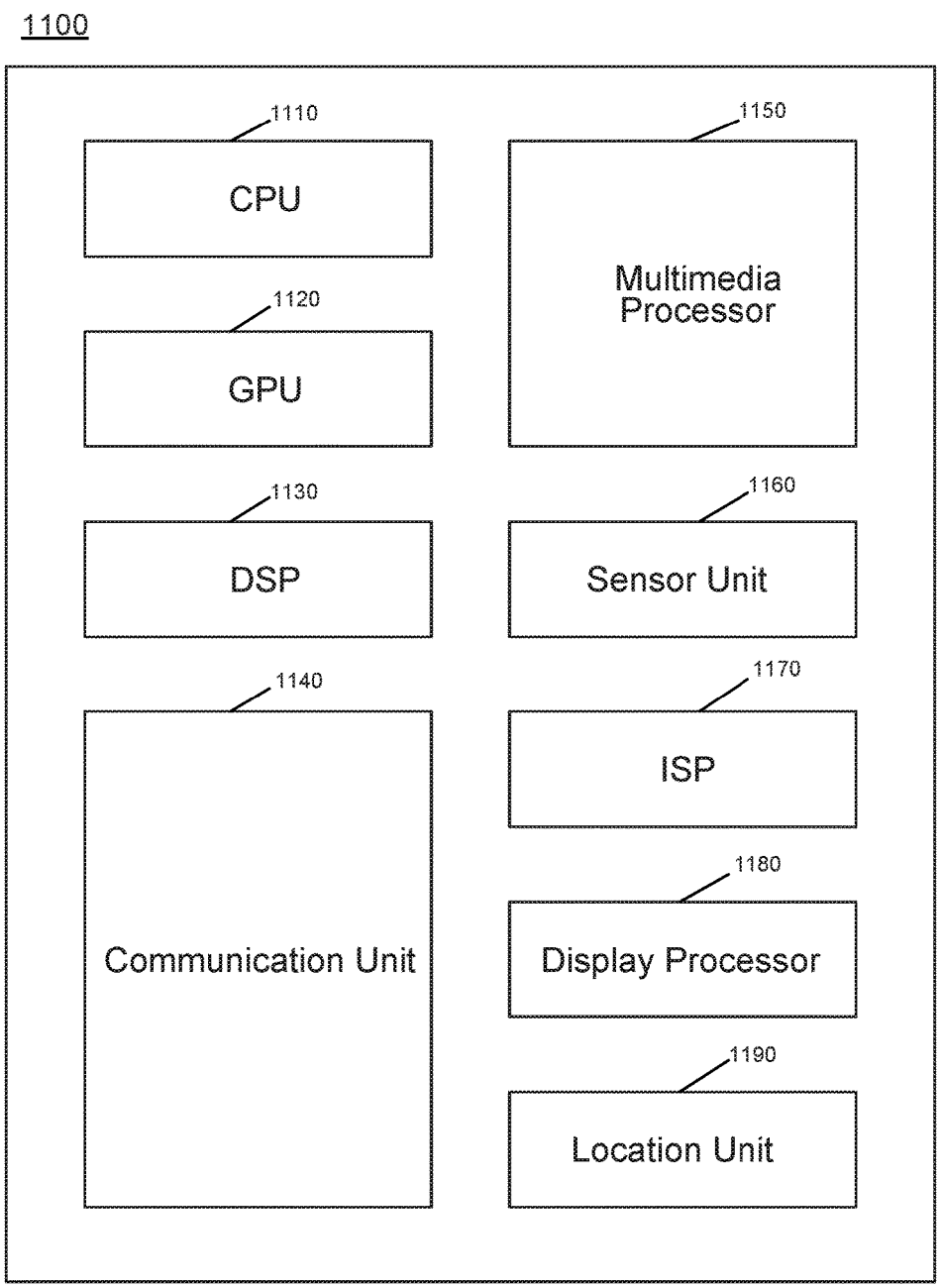
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
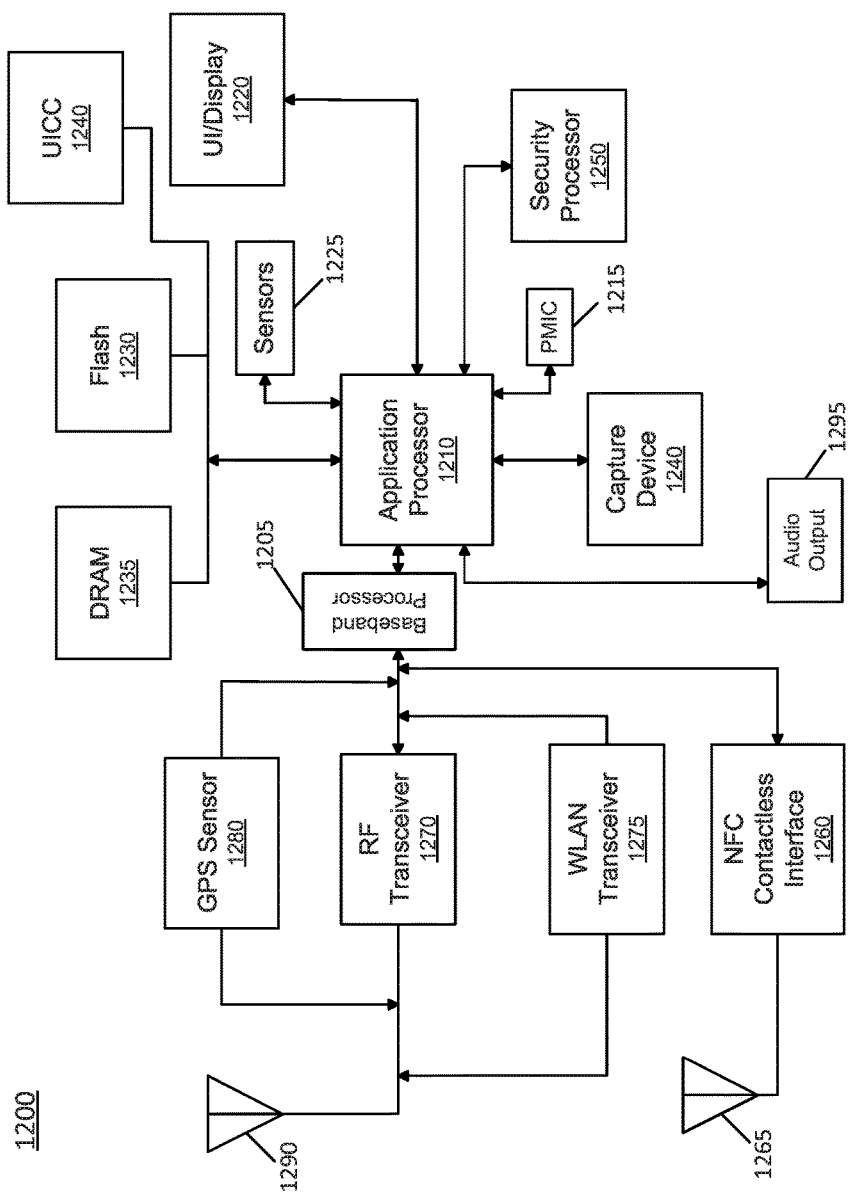
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
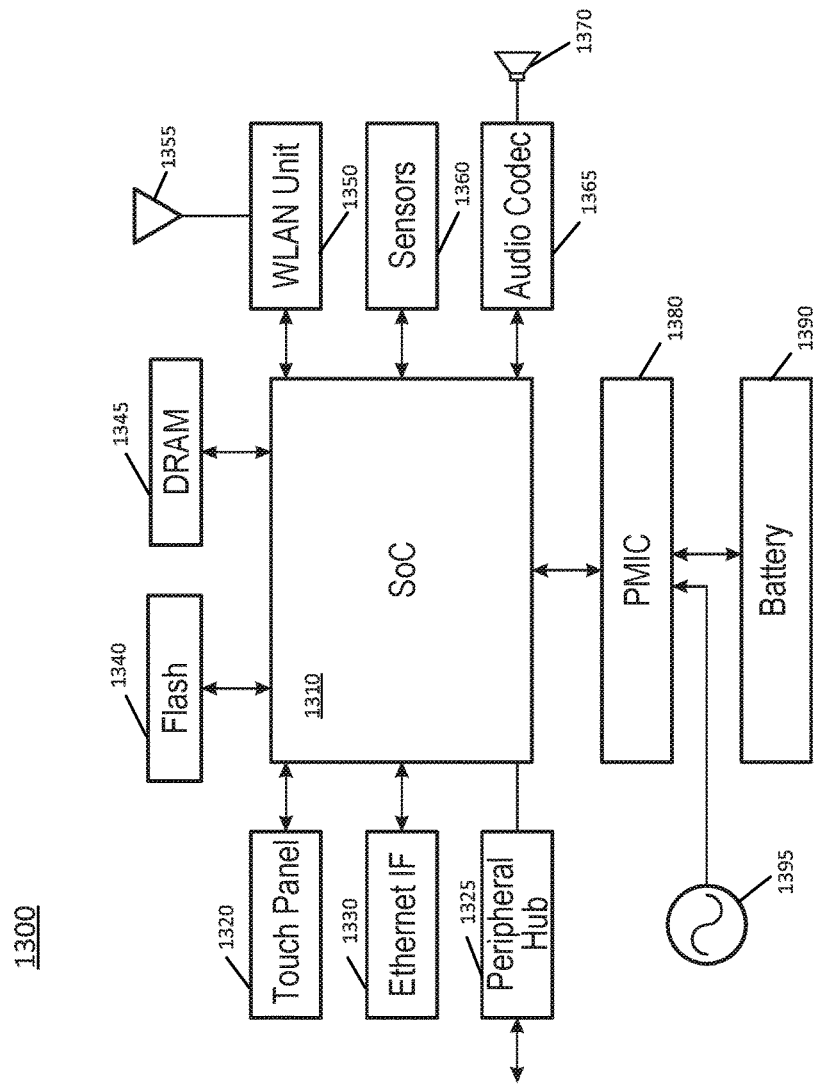
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
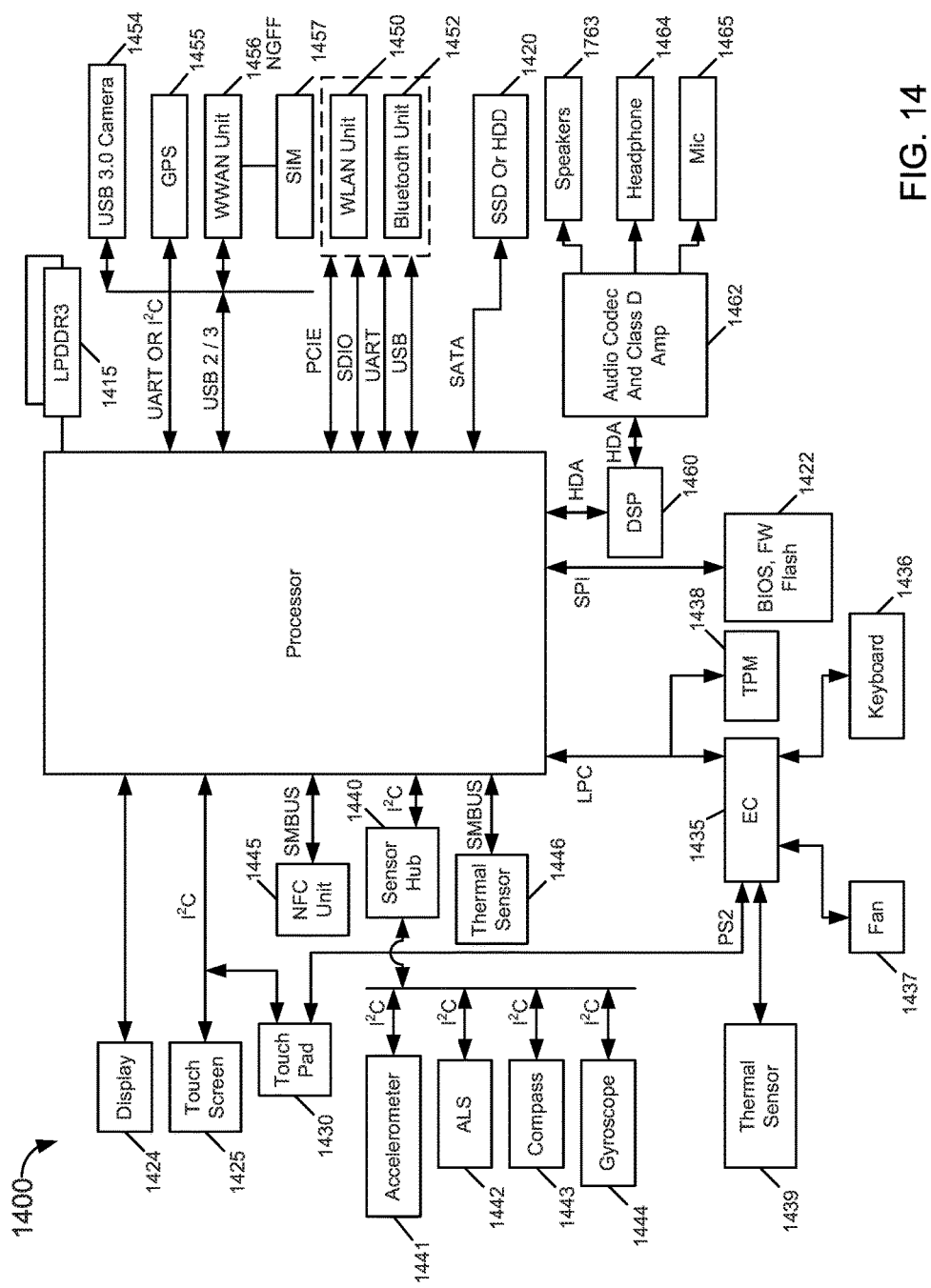
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
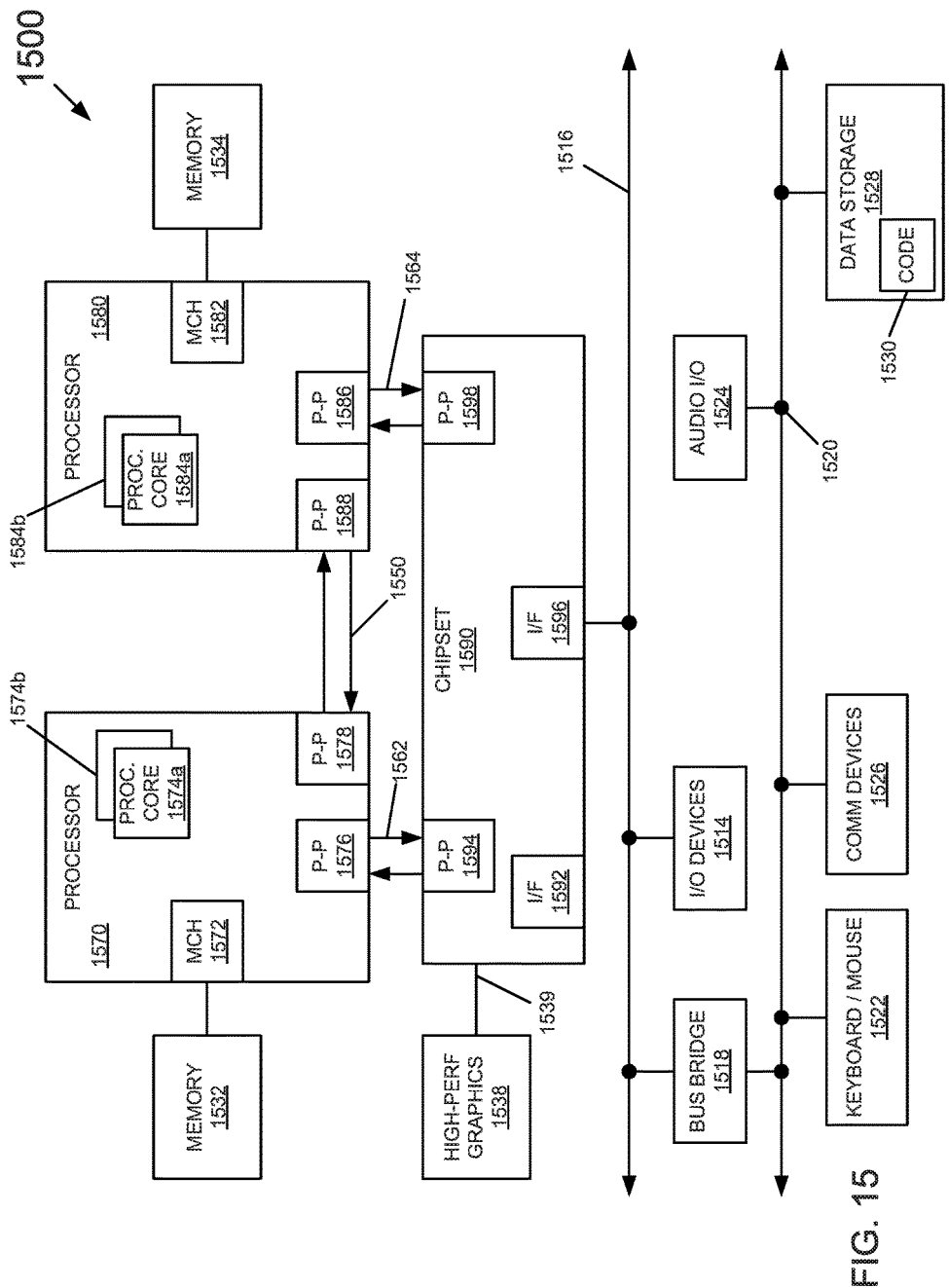
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include a PCU or other power management logic to perform processor-based power management as described herein, including workload classification and dynamic thread migration and core performance control based at least in part thereon.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

In an embodiment, a prediction logic is adapted to determine an optimal power configuration, and a control logic is adapted to apply the determined power configuration. The prediction logic collects input statistics periodically by reading performance/energy counters, and then using an intelligent model to evaluate the current status and predict the next optimal power configuration. The control logic applies this power control decision to the underlying system via thread migration and dynamic voltage and frequency scaling, in an embodiment. In some embodiments, one or more heterogeneous cores may be present that are specialized for memory-intensive workloads. Threads can migrate to such core(s) to save more energy during a memory-bound phase. A hardware thread migration technique may be used to migrate threads between compute-biased cores and memory-biased cores, which does not involve any software intervention, both from user applications and operating system standpoint.

Because compute-bound and memory-bound workloads have very different system requirements, the model solves a classification problem. Given a set of power configuration parameters (e.g., number of cores, number of threads, clock frequency and voltage) and runtime statistics (e.g., various performance/energy counters) at a current time sample, the goal is to find the optimal power configuration to maximize performance and energy efficiency for the next time interval. In different embodiments, two types of prediction models, expert heuristic and machine learning, may be used.

Figure 16:
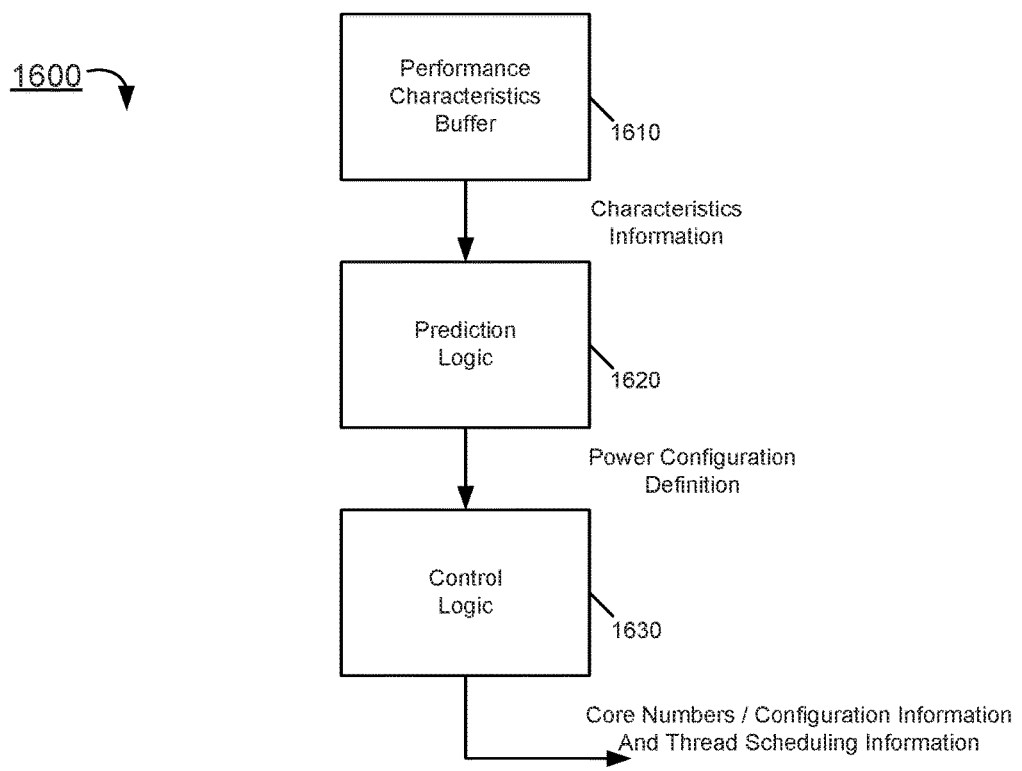
FIG. 16 is a block diagram of a power control logic in accordance with an embodiment of the present invention.

Referring now to FIG. 16, shown is a block diagram of a power control logic in accordance with an embodiment of the present invention. As shown in FIG. 16, power control logic 1600, which may be formed of combinations of hardware, software, and/or firmware, may be implemented as part of a larger power control unit of a processor such as a PCU. Such PCU in turn itself may be implemented as one or more microcontrollers or other control logic. In the embodiment shown, power control logic 1600 includes a performance characteristics buffer 1610. As described herein, buffer 1610 may be configured to store incoming performance characteristics, e.g., obtained from performance/energy counters of the various cores and other logic of a processor and/or system having such processor.

In turn, the characteristics information is provided to a prediction logic 1620. In different implementations, different types of prediction logic may be present. As described herein, such logic may include one or more models based on expert heuristics and/or machine learning. From the incoming characteristics information regarding current processor operation, prediction logic 1620 may generate a power configuration definition. Such definition may be used to define appropriate processor operation controls for a next operation interval. In an embodiment, such power configuration definition information may include a number of cores to be active in the next operation interval, corresponding threads to be scheduled to such cores, and voltage/frequency at which the selected cores are to operate.

As seen, this power configuration definition information is provided to a control logic 1630, which may be configured to enforce the definition in the next operation interval. As such, control logic 1630 may be configured to provide control information to various processor entities, including clock generators such as one or more phase locked loops, one or more voltage regulators such as integrated voltage regulators or so forth. Still further, control information may be provided to the individual cores to indicate whether the given cores are to be powered on or off in the next operation interval. If a core is to be powered off, the core may take various actions, including saving its state to an appropriate storage to enable the core to enter into the requested low power state, gating one or more clock signals, and gating one or more power gates. For a core to become powered on in the next operation interval, such control may include ungating one or more clock signals, ungating one or more power gates, and restoring a state of the core from a given storage. Of course understand that in various embodiments, additional operations for such core low power state entry and exit may occur. Still further understand that in different implementations, a variety of different configurations of power control logic may be present.

For an expert heuristic model, experts identify the most relevant parameters of workloads and systems, create a prediction model to classify compute or memory bound workloads, and navigate toward the most energy efficient configurations for the identified workloads. For example, two intuitive heuristic models may be used. Due to design complexity, heuristics may only select a subset of many possible parameters, called hot states, that are featured from the most popular configurations in the design space exploration.

For a simple classification heuristic model (H1), two parameters may be used to make decisions, e.g., instruction per second (IPS) and memory bandwidth (memBW). IPS is an indicator of core utilization while memBW directly shows memory occupancy. Workloads with low IPS and high memBW are classified as memory-bound, while high IPS and low memBW workloads are classified as compute-bound. The thresholds of high and low are adjustable, e.g., by a user in some embodiments. The decision strategy may be as follows: enable a weak power configuration (fewer cores/threads and lower voltage/frequency) for memory-bound workloads and enable a strong power configuration (which may be a baseline configuration) for compute-bound workloads.

A feedback classification heuristic model (H2) first classifies workloads similar to H1. And, each classification has a preferred action; for example, memory-bound workloads will cause a weaker configuration to be enabled (first fewer cores/threads, then lower voltage/frequency), and compute-bound applications will cause a stronger configuration to be enabled. Mixed workloads have certain probabilities to go weaker or stronger. Then, an energy efficiency metric (EE) is calculated as IPS*IPS/PCL to estimate the current energy efficiency, where PCL is an estimated power consumption level derived from dominant power components such as leakage. Based on the positive or negative EE feedback from the last action, a new decision is made either to take the preferred action, to take same action as the last action, or to do nothing.

A comprehensive set of runtime workloads and system statistics can be as large as hundreds or thousands of features, such as the occupancy of many queue structures, the utilization of each functional unit, and so forth. To take all these combinations into account, the design space grows explosively. Therefore, embodiments may use machine learning techniques for data processing and decision making.

In a machine learning model, runtime statistics may be included as attributes. A multi-dimensional record is a collection of average statistical values for all attributes during a sampling time period. The most energy efficient configuration for each time interval is assigned a label with the information of cores, threads, voltage, and frequency. The model predicts the next optimal power configuration.

During the machine learning training process, certain performance/energy characteristics may be identified from a large amount of data and used to make intelligent automatic decisions. The offline training process takes large dimension workloads/system statistics at a given time as inputs to predict the best power configuration. The offline training process may generate a set of coefficients (or weights) that can be programmed into the power controller (e.g., by storage in a non-volatile memory) for use in real time.

Thus during a design or configuration process, an offline data collection occurs. This offline data collection process may be performed, e.g., by a processor designer, during the design phase and/or after manufacture. In the process, a variety of different workloads may be executed (and/or simulated) such as representative benchmark workloads to enable characterization of the workload on the processor (as determined by performance and energy parameter information). In some cases, a large number of benchmark workloads may be used to appropriately train a machine learning classifier.

In an example, during an offline data collection of a representative workload, multiple workload phases are identified, and during each workload phase, a data point may be generated for a particular power configuration. Then an exhaustive search for all possible configurations is performed to collect a set of representative workload data. The calculated performance and energy are used to preprocess the best energy efficient configurations, while a performance drop constraint may be enforced to filter out too much performance sacrifice. Then, each data point is labeled with its best configuration name for a later supervised learning process.

In different embodiments, a given set of relevant attributes may be considered. In one embodiment, these attributes include IPS, memBW, average roundtrip memory latency (memLat), memory instruction percentage (memInst), floating point instruction percentage (FPinst), ALU instruction percentage (ALUinst), pending outgoing memory requests queue occupancy (memQ), and last level cache miss rate (LLCMiss). Such attributes may best represent the workload behaviors and effectively help reduce the number of performance/energy counters.

In different embodiments, various offline supervised models may be used. In one example, a multi-class logistic regression model with a ridge estimator may be used to measure the relationship between more than two categorical dependent or independent variables, which exhibit good accuracy and simple implementation. In another example, a multilayer perceptron may be used. This model is an artificial neural network classifier that uses backpropagation, which may be suitable for abundant data with non-linear behaviors. The nodes are all sigmoid (logistic functions) and have at least three layers. The input layer takes all the selected attributes, and the output layer produces the optimal power configurations. As another example, a decision tree model may be used, which maintains a flowchart-like tree structure in which leaves represent labels (all possible optimal configurations), and branches are conjunctions of attributes. At each node of the tree, an attribute is selected to effectively split data points into subsets in one class and the other.

Once the models are trained, they are implemented into a power controller for online prediction. At runtime, performance/energy counters corresponding to the selected attributes are collected and the trained machine learning model predicts the next optimal power configuration. To improve accuracy, runtime feedback mechanisms can be used and the machine learning decision to update a power configuration may be overridden to take no action. This is so, as it is possible for the machine learning model to switch back and forth between several power configurations very frequently, resulting in high switching overhead. A saturation counter for history tracking may be used to avoid such over-sensitive reaction. Also, the machine learning model may tend to choose high energy savings while sacrificing performance too much, especially for compute-bound workloads, where weaker system resources correlate to performance directly. An IPS history register per core may be used to detect a sudden performance drop due to a power configuration change.

The control logic is responsible for applying the optimal power control decision to the underlying system, which involves hardware controls (e.g., voltage and frequency scaling), and software controls (e.g., cores and threads mapping). In different embodiments, various thread mapping mechanisms may be used.

In one embodiment, a software layer (user applications, runtime libraries, and/or operating systems) may be modified. The prediction logic provides an interface to communicate the optimal power control decision, then software adjusts thread-to-core mapping via user-level threading (fork/join), dynamic runtime libraries such as Posix threads, etc., task queue scheduler, or operating system thread migration.

An application programming interface (API) may be provided so that user applications or runtime libraries can directly access the power controller to retrieve the optimal power configuration decision. If it is better to change the power configuration, applications or runtimes adjust thread-to-core mapping.

For example, if an application has a large parallel loop, a programmer or a compiler can split the loop into sections and insert power-query and thread management API calls to obtain the optimal configuration for each section and parallelize the next section accordingly. A runtime framework such as OpenMP and task queue will free the programming overhead from user applications. For example, when a user application parallelizes a loop with OpenMP, the runtime can call the power-query API to obtain the optimal configuration for the loop and manage threads and cores appropriately via a thread pinning API. A task queue library can also apply similar approaches. A task queue scheduler may be used to migrate tasks automatically based on the optimal power decision.

Another mechanism is to augment an operating system to provide thread management for all user applications. The operating system periodically interacts with the power controller and obtains the optimal configuration. It then schedules software threads to appropriate hardware contexts. For example, assume that a user application is running eight threads on four cores; two threads per core, but the operating system is informed that a single core is the optimal configuration. Then, the operating system assigns all eight threads only on one core even though a total of four cores are available. It migrates six threads from the other three cores to the selected one core and turns off the unoccupied three cores to save energy.

Embodiments may also use a transparent thread migration. In some cases, a processor may include heterogeneous cores, including compute-biased cores and memory-optimized cores. Such design is based on the observation that a single core architecture cannot optimize for compute-bounded and memory-bounded workloads simultaneously. For example, conventional multiprocessors are usually optimized for compute workloads targeting for many core counts running at high frequency. However, such multiprocessors may not be energy efficient during the phases that are mostly waiting for memory accesses. Therefore, one or more cores specialized for memory-intensive phases (a memory-biased or memory-optimized core) may be provided that run at low frequency to saturate memory resources, providing the same memory performance as many compute cores.

A thread migration mechanism may be used to switch execution between the two types of cores transparently to software, both user applications and operating systems. For example, assume that a system has one memory-optimized core and four compute-optimized cores. If each compute core is two-way SMT capable, the memory-optimized core is equipped with total eight hardware contexts. The memory-optimized core contexts are visible only to hardware and completely hidden from software. And, thread migration onto the memory-optimized core contexts is handled solely by hardware. A hardware controller clones the exact same thread context between the compute core and the memory-optimized core and then resumes the executing on the new core silently. Even the operating system cannot detect the underlying thread migration. In addition, because the memory-optimized core is just another core on the same cache coherency domain, it does not give rise to any memory consistency issue at all, though it might suffer from data migrating overhead from the context migration. Note that a memory-optimized core architecture provides new opportunities to optimize energy efficiency. Because only memory-intensive workloads are executed on it, its architecture can be specialized to the extreme to achieve order of magnitude higher efficiency than a general purpose core. In some cases, the memory-optimized core implements the same ISA as compute cores.

Figure 17:
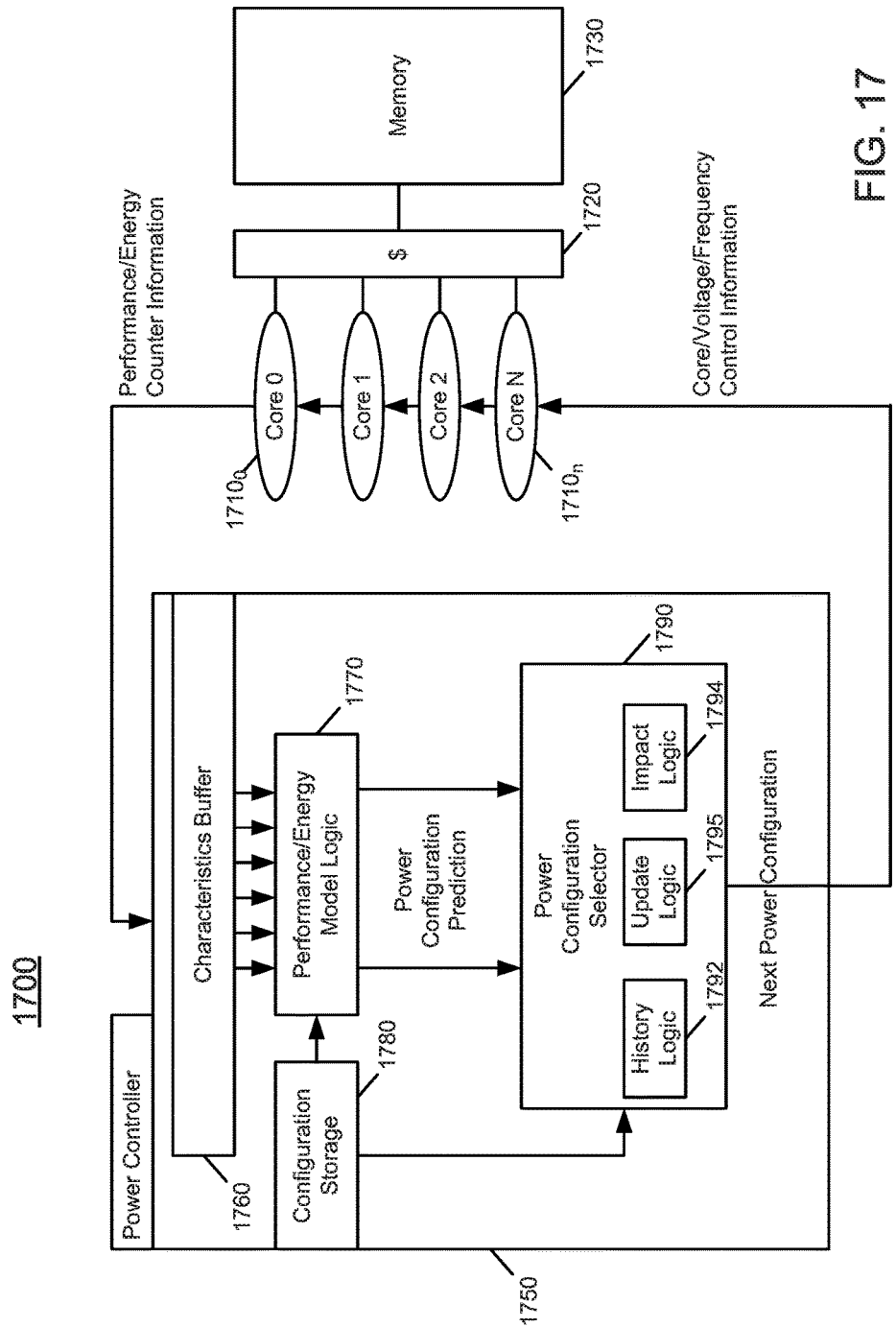
FIG. 17 is a block diagram of a processor including a hardware power control logic in accordance with another embodiment of the present invention.

Referring now to FIG. 17, shown is a block diagram of a processor including a hardware power control logic in accordance with another embodiment of the present invention. As illustrated in FIG. 17, processor 1700 is a multicore processor, which in a particular implementation may be a SoC having a variety of cores including at least some heterogeneous cores with different compute and memory capabilities. In this way, by appropriate control of active cores, a workload may be allocated amongst the cores to provide an efficient mix of power and performance. As seen, processor 1700 includes a plurality of cores $1710_0$-$1710_n$. In different embodiments, these cores may be a mix of in-order and out-of-order cores, as well as compute-biased cores and one or more memory-biased cores to provide for memory bounded operation at efficient and low core power.

As further illustrated in FIG. 17, cores 1710 couple to a cache memory 1720, which in an embodiment may be implemented as a shared cache memory such as a last level cache. Still further, processor 1700 may include an internal memory 1730, such as may be located on a separate die of a multi-die processor package.

During operation, performance/energy counters included within the various cores may be configured to provide characteristic information to a power controller 1750. In various embodiments, power controller 1750 may be implemented as a PCU that includes specialized hardware logic for performing model-based power control as described herein.

In the illustration of FIG. 17, power controller 1750 includes a characteristics buffer 1760 which may store the information incoming from the various cores. Although the scope of the present invention is not limited in this regard, such performance/energy characteristics may include instructions per cycle information, instruction mix information, load/store queue information, cache hit/miss information, memory latency information, and memory bandwidth information, among other such information.

As seen, buffer 1760 is coupled to a performance/energy model logic 1770, which may, based on the incoming characteristics information, determine a performance and energy prediction. In different embodiments, performance/energy model logic 1770 may include hardware to implement a given model such as an expert heuristics-based model, a machine learning-based model and/or combinations thereof. Still with reference to FIG. 17, note that performance/energy logic 1770 further receives input from a configuration storage 1780. In general, configuration storage 1780 includes information regarding possible operating characteristics, including a number of active cores (e.g., from 0 to n) and the voltage/frequency pairs for the given number of active cores. In embodiments in which performance/energy logic 1770 is a heuristic-based logic, configuration storage 1780 may further provide a heuristic storage to store one or more lookup tables having a plurality of entries each of which may be used to store workload characteristics information associated with a particular workload classification and corresponding power configuration. In embodiments in which performance/energy logic 1770 is a machine learning-based logic, configuration storage 1780 may further provide a trained model parameter storage (e.g., via a non-volatile storage) to store one or more tables having a plurality of entries each of which may be used to store trained model parameters obtained during an offline training process.

In some embodiments, a model for both machine learning and heuristic approaches may be implemented as an equation that includes input parameters (workload characteristics such as IPS, etc.) and a set of coefficients to provide a weight for each parameter. The equation may be used to compute a numerical value that represents an optimal configuration state for the processor for a next operation interval. This value may be used as an index to a table with different configuration parameters. In these cases, configuration storage 1780 provides a table of coefficients for each parameter. In general, the equation (or the format of the equation) is fixed. Therefore, only the coefficients may change. In the heuristic approach, the coefficients are fixed once during manufacturing. In the machine learning approach, the coefficients are obtained during offline training and programmed into the storage. When operating, the coefficients can be updated online based on machine learning.

Still with reference to FIG. 17, power controller 1750 further includes a power configuration selector 1790 which may receive a given performance energy prediction for a next operation interval and determine an appropriate next power configuration to provide operation controls to cores 1710 for the next operation interval. In the embodiment shown in FIG. 17, power configuration selector 1790 includes a history logic 1792, an impact logic 1794, and an update logic 1795.

In general, history logic 1792 may be configured to analyze an incoming prediction and determine based on short-term and/or long-term history whether the prediction is appropriate and should be provided to control the cores for the next operation interval, or not. For example, a number of predictions of a particular configuration (e.g., for a reduced number of cores) may be consecutively made (e.g., 3 or more) before a configuration change to effect a reduced number of cores occurs. History logic 1792 may also be used avoid over-sensitive control of power management by reference to historical states is necessary. In one embodiment, history logic 1792 may implement a lazy switch scheme via a counter (e.g., a 2-bit saturated counter) for each possible decision. This counter is incremented when a power gating decision is made, for example. Only when the same decision is made during a predetermined number of consecutive time intervals (e.g., 3), by reference to the counter, is a power configuration update executed. In other cases, history logic 1792 may implement a history table to record prior power configuration decisions and system states.

Impact logic 1794 may be configured to determine an impact that predictions and configuration updates are having on the power and/or performance of the processor and to constrain or prevent predictions from being provided as a control to the cores.

As further shown in FIG. 17, power configuration selector 1790 further includes an update logic 1795. Update logic 1795 may determine whether to enable a power configuration update based on near past decisions (e.g., with reference to entries in the history table) and far past decisions (via a long term accumulative function). Thus update logic 1795 may be configured to perform self-learning during a lifetime of processor operation (from an initial boot of the processor through multiple boot cycles (and possibly many years of operation)), by updating trained model parameters based on actual usage of the processor in the field. Understand while shown at this high level in the illustration of FIG. 17, many variations and alternatives are possible.

Figure 18:
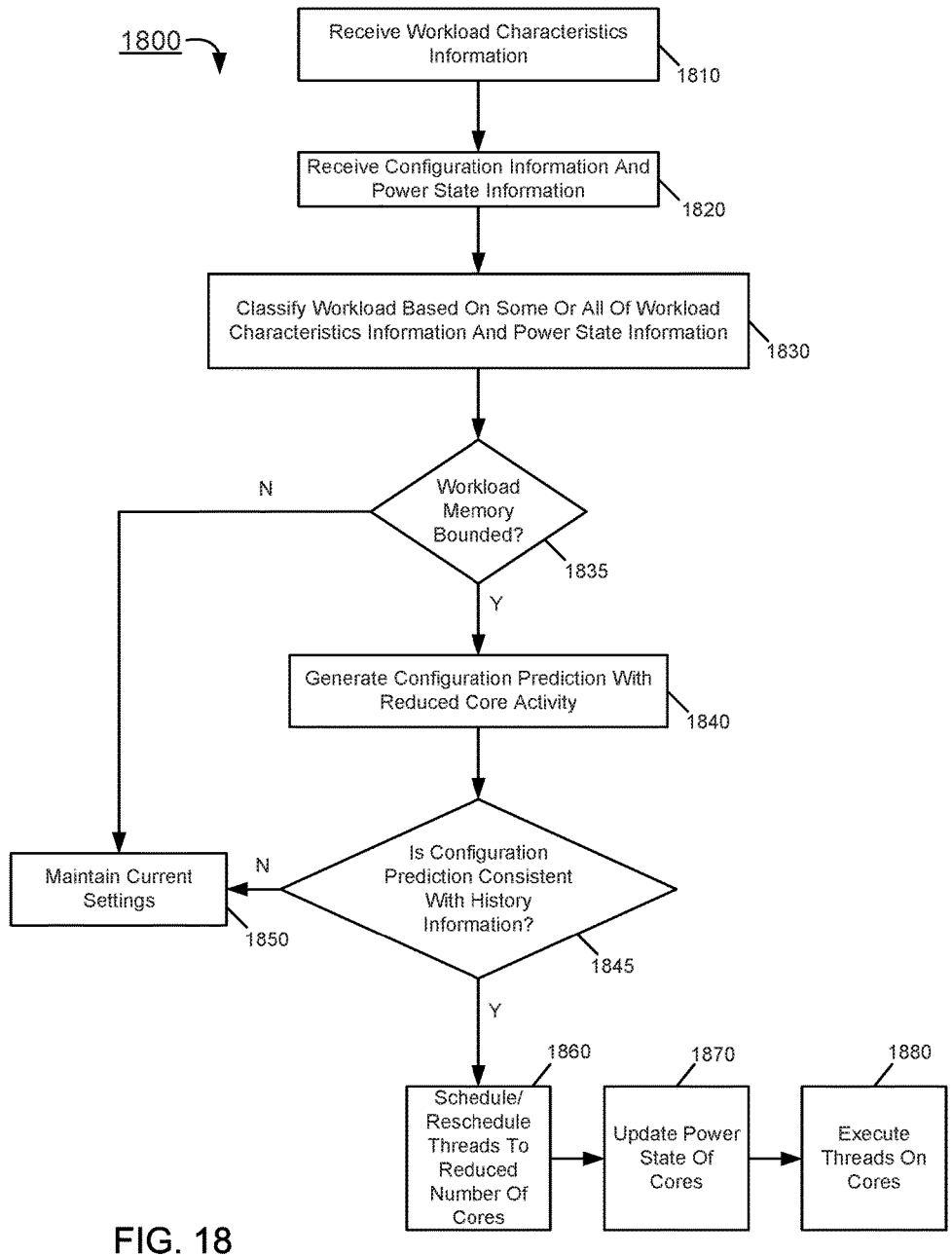
FIG. 18 is a flow diagram of a method for controlling power consumption of a processor in accordance with an embodiment of the present invention.

Referring now to FIG. 18, shown is a flow diagram of a method for controlling power consumption of a processor in accordance with an embodiment of the present invention. In the embodiment shown in FIG. 18, method 1800 may be performed by appropriate combinations of hardware, software, and/or firmware, such as a hardware power control logic as described herein, which may be implemented as part of a power controller, itself implemented as one or more microcontrollers. In one embodiment, method 1800 may be performed by a model logic that implemented a heuristic-based model. As seen, method 1800 begins by receiving workload characteristics information (block 1810). As described, such information may be received from performance/energy counters of various cores and other logic of a processor. In addition, configuration and power state information is also received (block 1820). This configuration information may correspond to a number of actively powered cores in a current operation interval and the power state thereof (e.g., a given power level at which the core is operating). In some embodiments, the power state information may further include performance state information, which may correspond to a particular voltage/frequency level at which the cores are operating. In some cases the performance state for a core may be at a guaranteed operating frequency (which is a maximum operating frequency at which a processor is guaranteed to operate), a turbo mode frequency (which is an opportunistic operating frequency higher than this guaranteed frequency), or an efficient frequency level, which is an operating frequency lower than the guaranteed frequency.

Still with reference to FIG. 18, next control passes to block 1830, where the workload may be classified. More specifically, the workload can be classified based on some or all of the received workload characteristics information and power state information. At a high level, this workload classification may be determined to be at one of a limited number of possible levels, including a memory bounded level, a compute bounded level, or a typical operating level, which may generally correspond to a workload that is operating between a memory bounded level and a compute bounded level. Control next passes to diamond 1835 to determine whether the workload is memory bounded. Although the scope of the present invention is not limited in this regard, in an embodiment the determination of workload memory boundedness may be based on an aggregate of latency information obtained from the various cores in operation, bandwidth information associated with the memory bandwidth or so forth.

If it is determined that the workload is not memory bounded, control passes directly to block 1850 where current settings may be maintained. As such, in the next operation interval, the same number of cores may be powered on and these cores may continue to execute the current threads at current frequency and voltage levels.

Instead if it is determined that the workload is memory bounded, control passes from diamond 1835 to block 1840, where a configuration prediction may be generated. More specifically, this configuration prediction may be for a scenario with reduced core activity, in that one or more currently active cores can be powered down and/or compute-intensive cores may be powered down in favor of one or more memory-intensive cores, to enable improved handling of the memory bound condition. Control next passes to diamond 1845 to determine whether the configuration prediction is consistent with history information. Such determination can be based on history information indicating of the appropriateness of prior predictions. If the prediction is not consistent, control passes to block 1850 where the current settings may be maintained. Note that in some cases, in addition to this history analysis a determination also may be made as to whether the predicted configuration would adversely affect performance. For example, if the configuration prediction if effected would increase a performance penalty greater than a threshold level (e.g., 5%), the new configuration may not be effected and control thus passes to block 1850.

If instead it is determined that the configuration prediction is consistent with history information (and/or is not predicted to adversely affect performance by more than a threshold level), control passes to block 1860, where threads to be executed in the next operation interval may be scheduled/rescheduled to the reduced number of cores. For example, threads currently executing on a core to be powered down may be rescheduled to cores that are to remain powered on. This is the case as in various embodiments, the cores may be multithreaded such that multiple threads can concurrently execute on a single core, e.g., via multiple logical processors, which provide appropriate hardware thread resources to enable concurrent execution. In other cases, threads may be rescheduled from certain active cores to other active cores to better accommodate and provide for efficient operation (such as moving from compute cores to memory-biased cores). Next control passes to block 1870 where the power state of the cores may be updated. That is, various control signals are sent to the cores, clock generators, voltage regulators and so forth to enable appropriate activation/deactivation of given cores. Thereafter, operation occurs in the next interval operation interval in which the threads execute on the active cores (block 1880). Understand while shown at this high level in the embodiment of FIG. 18, many variations and alternatives are possible.

Figure 19:
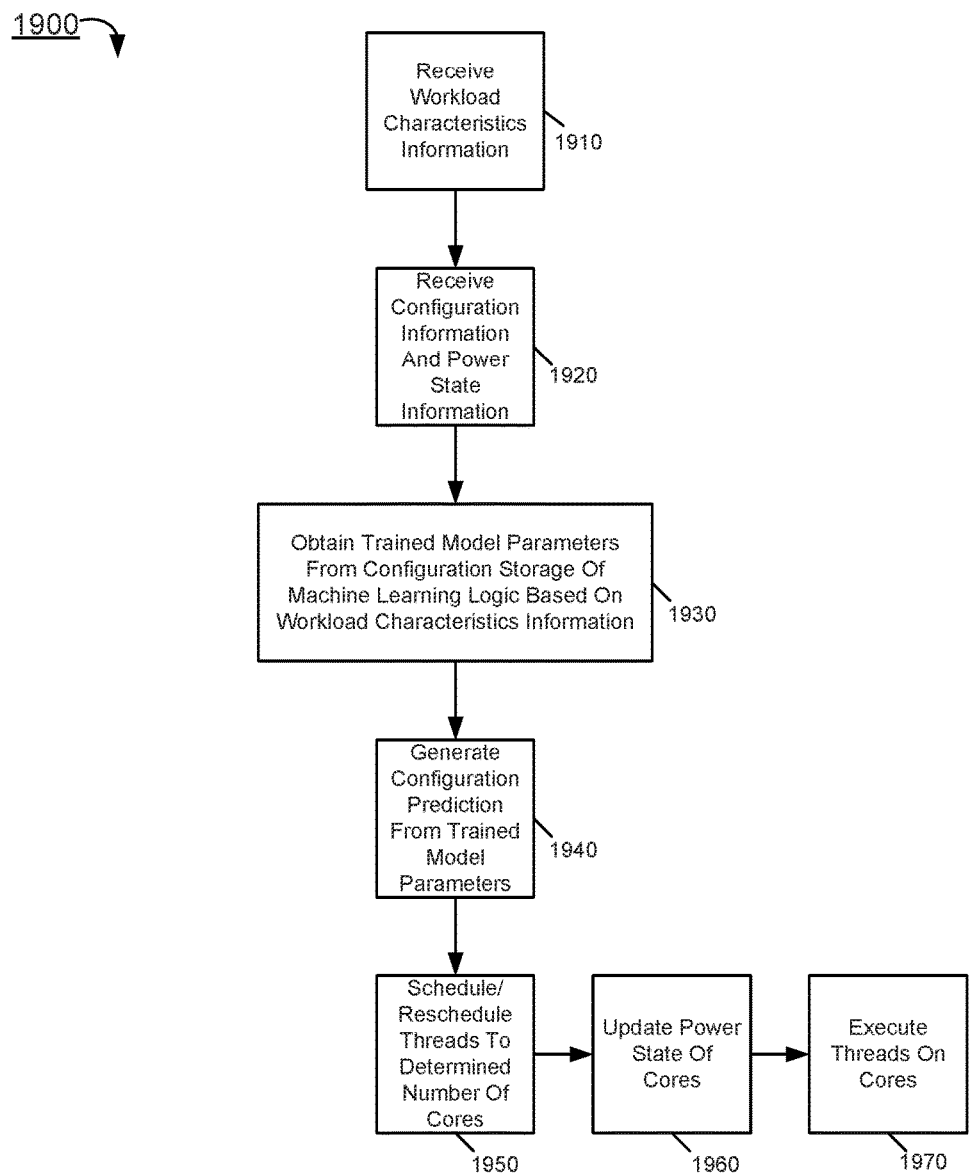
FIG. 19 is a flow diagram of a method for controlling power consumption of a processor in accordance with another embodiment of the present invention.

Referring now to FIG. 19, shown is a flow diagram of a method for controlling power consumption of a processor in accordance with another embodiment of the present invention. As seen in FIG. 19, method 1900 may be performed by appropriate combinations of hardware, software, and/or firmware, such as a hardware power control logic as described herein. In one embodiment, method 1900 may be performed by a model logic that implements a machine learning-based model. Method 1900 begins by receiving workload characteristics information, e.g., from performance/energy counters within the processor (block 1910). In addition, configuration and power state information is also received (block 1920). This configuration information may correspond to a number of actively powered cores in a current operation interval and the power state thereof.

Next, control passes to block 1930 where trained model parameters may be obtained from a configuration storage based on the workload characteristics and power state information. More specifically, the machine learning control logic may perform a classification of the workload based on the workload characteristics information and power state information to obtain trained model parameters. These parameters may correspond to a given type of classified workload, such as compute bounded, memory bounded, typical workload or so forth. Furthermore, given the higher computing capabilities of a machine learning classifier-based logic (as compared to a heuristic-based logic), more fine-grained analysis and classification of workload level can occur. As such, in addition to compute bounded, memory bounded and typical classifications, a plurality of levels of the compute bounded classification, a plurality of levels of the memory bounded classification, in addition to a plurality of levels of a normal operation classification also can be identified and classified.

Still with reference to FIG. 19, control passes to block 1940, where a configuration prediction can be generated from the trained model parameters. Note that in some cases, before a power configuration is updated, the machine learning logic may estimate long term and short term performance/energy impact due to previous actions taken. In an embodiment, two reward functions are implemented in the power controller for short term and long term impact evaluation. For example, if the overall reward values (a weighted combination of short term and long term rewards) indicate the model is making too aggressive predictions (and adversely affecting performance), this power configuration update does not occur. Further, as described, with regard to FIG. 20, self-learning may occur in which trained model parameters can be adjusted by update to the trained model parameters, e.g., to be more conservative with regard to performance impact. Thereafter, control passes to block 1950, where threads may be scheduled (and rescheduled if needed) to the determined number of cores. In some embodiments, such thread scheduling may be performed in a hardware manner transparent to an OS or other software. In other cases, the OS itself may perform thread scheduling on the indicated number of cores.

Control next passes to block 1960, where the power state of the cores may be updated. For example, various control signals are sent to the cores, clock generators, voltage regulators and so forth to enable appropriate activation/deactivation of given cores. Thereafter, operation occurs in the next interval operation interval in which the threads execute on the active cores (block 1970). Understand while shown at this high level in the embodiment of FIG. 19, many variations and alternatives are possible.

Understand that a machine learning logic in accordance with an embodiment of the present invention provides the ability for machine-based self-learning, such that a baseline of trained model parameters, e.g., provided upon manufacture of a processor, can be updated based on actual usage of the processor in the field, e.g., by a particular end user that operates a system including the processor with generally similar workloads during the lifetime of the processor. Furthermore, as the workload and usage of the processor varies over its lifetime, these trained model parameters can be updated based on such self-learning, to enable optimized performance and power management during processor lifetime.

Figure 20:
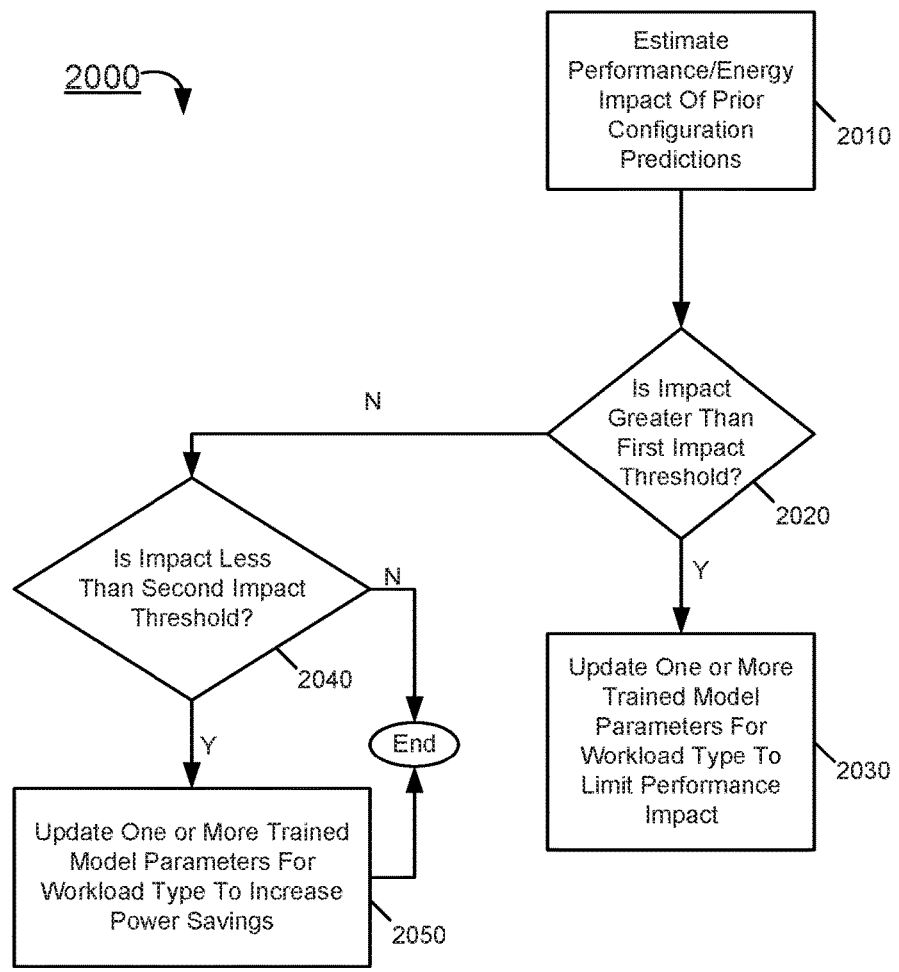
FIG. 20 is a flow diagram of a method for updating trained model parameters in accordance with an embodiment of the present invention.

Referring now to FIG. 20, shown is a flow diagram of a method for updating trained model parameters in accordance with an embodiment of the present invention. As shown in FIG. 20, method 2000 may be performed by appropriate combinations of hardware, software, and/or firmware, such as a hardware power control logic as described herein that implements a machine learning-based model.

As seen, method 2000 begins by estimating a performance/energy impact of prior configuration predictions for a workload under analysis (block 2010). As an example, this impact may be with regard to performance loss as a result of a reduced number of active cores (and/or reduced frequency of core operation). Next, control passes to diamond 2020 to determine whether this impact is greater than a first impact threshold. For example, in some embodiments this impact threshold may be a high impact threshold and may be set at a predetermined level, e.g., a performance impact measured in percentage of performance loss. As an example, this threshold level may be less than approximately a 10% performance loss. If it is determined that the impact is greater than the first impact threshold, control passes to block 2030 where one or more trained model parameters may be updated. More specifically, for a particular workload type under analysis, one or more trained model parameters may be updated to limit the performance impact of the power management configurations identified in the trained model parameters. As such, dynamic machine or self-learning occurs over processor lifetime, such that an appropriate balance of performance and power management can be realized.

Still with reference to FIG. 20, if instead it is determined at block 2020 that the impact is not greater than this first impact threshold, control passes next to diamond 2040 to determine whether the impact is less than a second impact threshold. As an example, this second impact threshold may a low impact threshold and may be set a different predetermined level, e.g., less than approximately a 2-3% performance loss, in an embodiment. If it is determined that the impact is above this threshold, no update or self-learning occurs, as appropriate trained model parameters for current execution exist. Otherwise, if it is determined that the impact is less than the second impact threshold, control passes to block 2050, where one or more trained model parameters may be updated. More specifically, for a particular workload type under analysis, one or more trained model parameters may be updated to provide for further power savings control by way of the power management configurations identified in the trained model parameters. As such, dynamic machine or self-learning occurs over processor lifetime, such that an appropriate balance of performance and power management can be realized. Understand while shown at this high level in the embodiment of FIG. 20, many variations and alternatives are possible.

Based on the particular model logic implemented (and self-learning performed during processor lifetime), many memory bound and compute bound workloads can realize optimal performance and energy efficiency with fewer active compute resources and/or lower frequencies. By identifying and selecting an optimal configuration for each particular workload, embodiments may provide energy savings of approximately 4×, while maintaining performance loss within less than approximately 5%.

Figure 21:
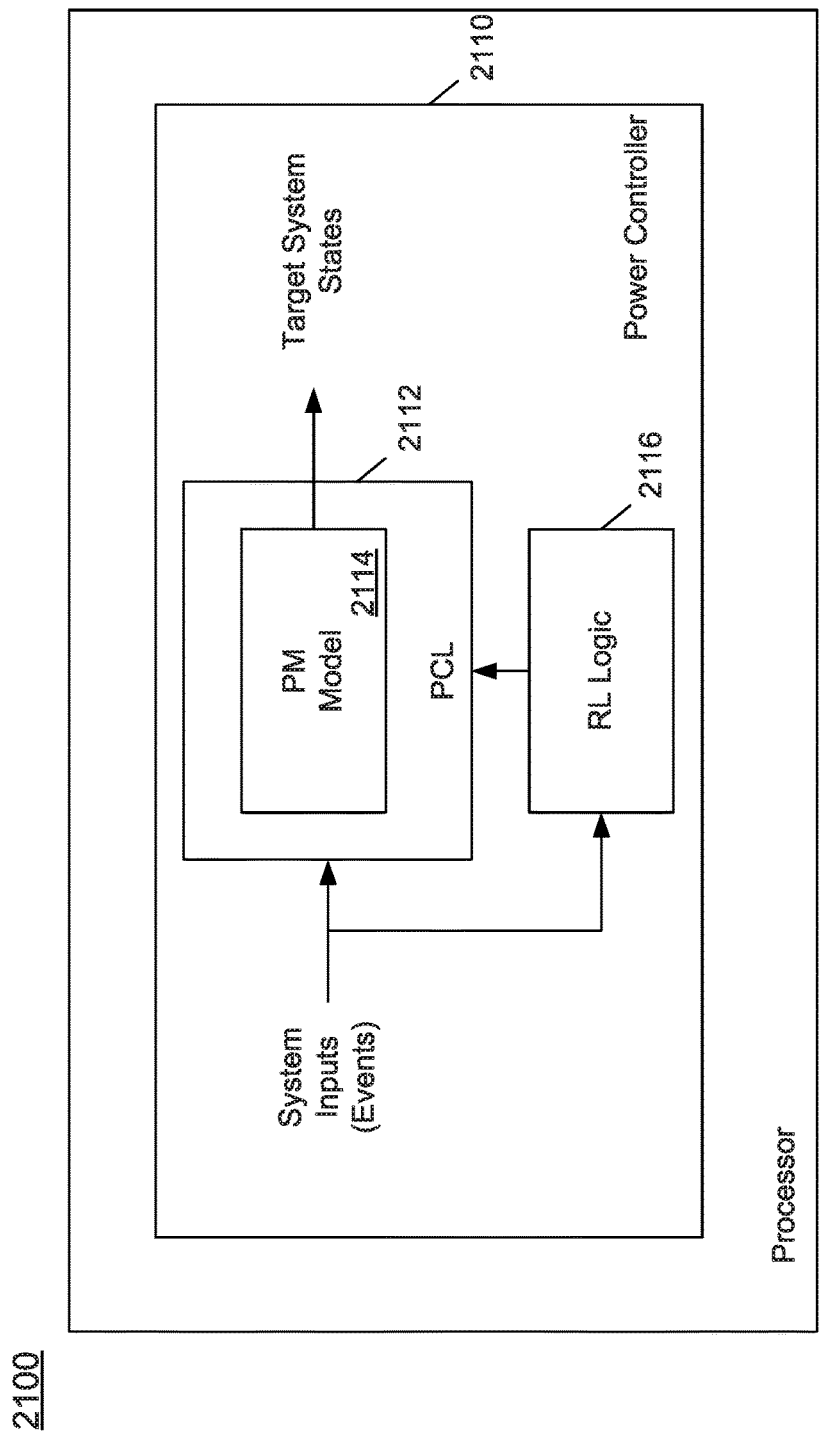
FIG. 21 is a high level block diagram of a processor in accordance with another embodiment.

Referring now to FIG. 21, shown is a high level block diagram of a processor in accordance with another embodiment. As shown in FIG. 21, processor 2100, which may be a multicore processor or other SoC, includes a power controller 2110. Such power controller 2110 may be implemented by various combinations of hardware, software, and/or firmware. In one such embodiment, power controller 2110 may be implemented as a separate microcontroller. In other cases, power controller 2110 may be implemented as a general-purpose processor core, e.g., allocated to power management. As an example, this core may be a sequestered core to execute power management firmware and/or other power management code.

In any case, power controller 2110 as shown in FIG. 21 includes a power control logic 2112. Power control logic 2112 may, in general, receive various system inputs such as performance monitoring information, environmental condition monitoring and so forth, and determine appropriate target system states from the system inputs. Although the scope of the present invention is not limited in this regard, such target system states may include performance parameters including voltage and frequency. To this end, power control logic 2112 includes a power management (PM) model 2114, which may be implemented in hardware to generate the target system states based on the system inputs.

Furthermore, to enable dynamic update to PM model 2114, e.g., by way of machine learning, a reinforcement learning (RL) logic 2116 may also be implemented within power controller 2110. More specifically as shown, RL logic 2116 similarly receives the system inputs and performs online reinforcement learning to determine appropriate updates to PM model 2114. Thus in various embodiments, PM model 2114, used for making power management decisions, is developed/updated online (rather than offline), which is in contrast to a predefined control model that is encoded, e.g., into a read only memory, during a design phase. In some embodiments, RL logic 2116 may be implemented as a hardware control unit that receives the same inputs from the system as PM model 2114, and processes the inputs to determine if any update to the model is appropriate to improve the accuracy/efficiency of the current PM model. Understand that there are many possible ways to implement RL logic 2116 (such as using a convolutional neural network (CNN) with a batch size of one). In one particular embodiment, RL logic 2116 may be implemented using an adaptive Kanerva coding mechanism, as described below, which may be an area-efficient option.

While many different system inputs, including combinations of one or more of performance monitoring information, environmental information and other information, can be used as attributes for reinforcement learning, in embodiments, a selected subset of attributes may be used to represent system state. In one particular embodiment, 8 performance monitoring attributes may be selected: instruction composition (ALU instructions vs. branch instructions), memory access rates and cache hit/miss rates, and local accesses vs. global accesses, as shown in Table 1 below, which is a list of selected attributes for one embodiment. These attributes may be read every 10000 cycles and fed into a RL module (e.g., RL logic 2116 of FIG. 21) to enable the logic to determine what PM actions to take and to update the model, if necessary. Using an embodiment having reinforcement learning-based PM, approximately 20% improvement in energy efficiency may be realized.

TABLE 1

| Attribute | Descriptions |
| --- | --- |
| INT Instructions | Number of integer ALU instructions |
| Branch Instructions | Number of branch instructions |
| SIMD Instructions | Number of SIMD instructions (e.g., MMX, SSE, AVX, AVX2) |
| Memory Instructions | Number of memory instructions (loads and stores) |
| L1 misses | Number of DL1 cache misses |
| L2 misses | Number of L2 cache misses |
| LSQ entries | Load/store queue (LSQ) occupancy |
| Core Stall Cycles | Number of cycles the core is stalled |

RL is a computational approach for learning a goal via interaction with an environment, here a processor. Reinforcement learning is inspired by certain aspects of the human learning process, such as trial-and-error and delayed rewards, which distinguishes it from other machine learning approaches. Understand while shown at this high level in the embodiment of FIG. 21, variations and alternatives are possible.

Figure 22:
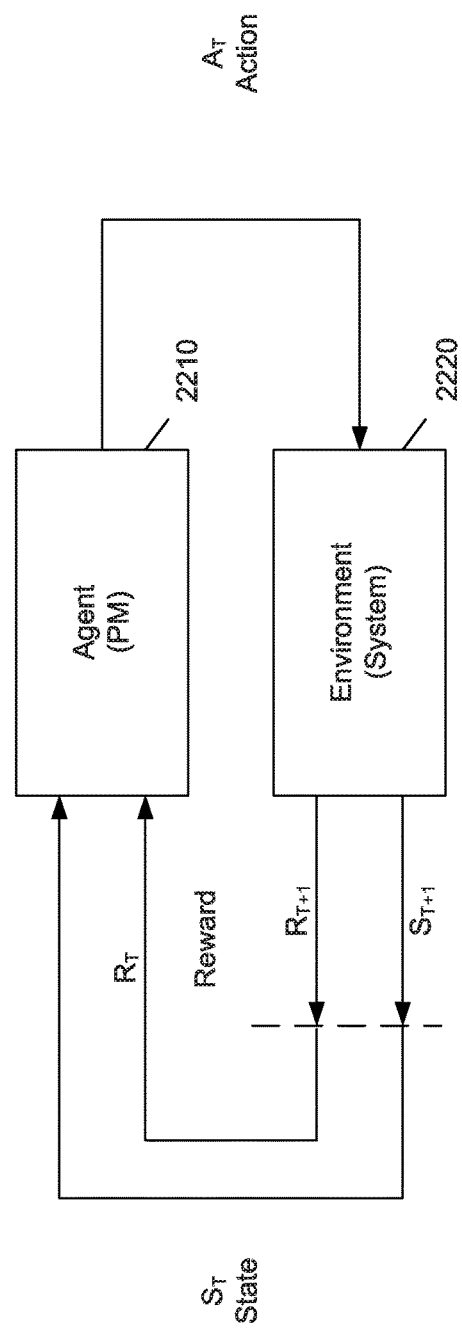
FIG. 22 is a block diagram of a reinforcement learning system in accordance with an embodiment of the present invention.

Referring now to FIG. 22, shown is a block diagram of a reinforcement learning system in accordance with an embodiment of the present invention. As shown in FIG. 22, system 2200 may be implemented within hardware of a processor. As seen, system 2200 includes an agent 2210. In an embodiment, agent 2210 may correspond to RL logic 2116 of FIG. 21. The inputs to agent 2210 include a state of the system at a given time step, $S_T$. Note that this state may include a large amount of information, including information obtained from performance monitoring hardware, environmental monitors, sensors and so forth. In addition, agent 2210 further receives a reward ($R_T$) for a given time step. This reward, in embodiments herein, may be a measure of energy consumed within the processor during a given time step or interval. This measure may take the form of an energy consumption metric, which may be an estimated energy consumption, a calculated energy consumption, or another metric to correlate a given energy consumption level for a particular time step.

Based on this input information (namely state and reward), agent 2210 may be configured to determine an appropriate action ($A_T$) to apply to environment 2220. This environment may, in embodiments herein, be the multicore processor or other SoC itself. And the action may correspond to information to control operating parameters of the processor, such as control information to control operating parameters, namely voltage and frequency. Understand that in other cases, the operating parameters may be parameters other than (or in addition to) voltage/frequency, such as changes to system/processor configuration, partitioning of resources, thread control, and so forth. As such, environment

2220 may adjust various operational parameters to result in an updated state ($S_{T+1}$) and an updated reward ($R_{T+1}$).

Thus as shown in FIG. 22, reinforcement learning framework 2200 incorporates agent 2210 (which may be a power controller of a processor such as a power manager or PM) that acts as a learner and decision maker, and environment 2220 (the system) that encompasses everything outside of agent 2210 and interacts with agent 2210. These interactions occur in a sequence of discrete time steps t=0, 1, 2, . . . N. In each step, the agent selects an action and applies it to the environment; the environment responds to the action and presents new situations back to the agent. A policy, which is a mapping from environment states to probabilities of selecting different possible actions, specifies how the agent behaves in different situations. Reinforcement learning can be treated as a process in which the agent evolves the policy as a result of its experience. At each step, the environment returns an immediate reward, namely a numerical value whose long term sum the agent seeks to optimize.

The power manager (PM) of the system is modeled by RL agent 2210. It makes decisions about which voltage-frequency (VF) pair to apply to the system. The agent also senses the rest of the system environment, collects system statistics as attributes, and receives immediate rewards from the system. The entire process occurs at each sampling interval (step), which may be a fixed time period. Although the scope of the present invention is not limited in this regard, each sampling interval may be between approximately 1 microsecond and 1 milliseconds.

As shown in FIG. 22, agent 2210 and environment 2220 interact by way of actions, state and reward. Actions, in an embodiment, may be application of a VF pair to the system. The VF space is divided into multiple VF levels. A state space, in an embodiment, is implemented as a vector of runtime attributes. An attribute is an observed performance metric tracked by the processor (e.g., last level cache miss rate). These attributes are typically selected from performance and power statistics and discretized to construct a vector to represent a state.

To learn to minimize long term energy consumption, an immediate reward R is assigned a value of −1×(energy consumption in an interval), so that the cumulative reward is the negative of the total energy consumption. As a result, maximizing total reward is equivalent to minimizing the total energy. The energy consumption in an interval can be computed by average power×execution time, where execution time is derived from cycle counts and current frequency. Power consumption can be measured at runtime from the voltage regulator, in an embodiment. In some cases, however, the reward is assigned a penalty value of a large negative number to prevent undesired performance losses. The performance loss is computed between adjacent intervals when an action is taken. By adjusting the penalty values, the performance can be changed, which permits the energy-delay space be fully explored at runtime. Note that performance can be measured by numbers of instructions executed, or number of floating-point operations completed, number of bytes of data loaded/stored, and so forth. When the absolute penalty value is small, the reinforcement learning algorithm pursues a DVFS management policy toward the lowest energy, regardless of any performance loss. If the absolute penalty value is sufficiently large, the policy will be trained to pursue the lowest energy without performance losses. Any penalty value in between will guide the online learning to find the lowest energy under a specific performance constraint.

Feature or attribute selection is the process of selecting a subset of the most relevant features to build a model in machine learning and statistics. To arrive at the feature subset, an initial attribute space with thousands of features can be searched by a best-first algorithm, and evaluated by a correlation feature selection (CFS) subset evaluator. After the feature selection process, the number of attributes is ultimately pruned to a relatively small number. Although the scope of the present invention is not limited in this regard, the selected number of attributes may be between 3 and 50, in an embodiment.

Kanerva coding is an effective generalization and functional approximation approach to reduce the complexity of high dimensional state-action spaces. An improved approach, adaptive Kanerva coding, is applied to the power management application here, to select a representative subset of states to stand in for the entire state space. This selection can be dynamically changed over time to improve the performance. A value function Q(s, a) in reinforcement learning is associated with every state-action pair, and in the context of adaptive Kanerva coding, each value function corresponds to a subset of states and actions.

A state that is selected to be the representative of a subset of states is called a prototype. Like any other state, it is a vector of attributes, and each attribute has a different number of possible values. Two states are adjacent if their value representations differ in at most one place. For example, if a prototype has two attributes <attr1, attr2>, where attr1 can choose from {0, 1}, and attr2 can choose from {a,b,c}, then state <1,a> is adjacent to states <0,a>, <1,b> and <1, c> but is not adjacent to states <2, b> or <2, c>, since more than one element differs among these states.

For implementation in a minimal space within a processor, a model may implement a prototype table to store a set of chosen prototypes that is substantially smaller than the full set of states. In embodiments, this prototype table stores a subset of states that forms the PM model. In embodiments a PM model may include other items, such as updating rules, epsilon-greedy policy, decision making logic, action taking logic, and so on. The i-th table entry incorporates a prototype pi, and a prototype value θ(pi,a) for each action a. When action a is taken in state s, resulting in a reward r and a transition to next state s', the prototype value θ(pi, a), is updated as follows:

$$\theta(pi,a)=(1-\alpha)\theta(pi,a)+\mu i(s)\alpha(r+\gamma \cdot \max Q\hat{}(s',a')),$$

where µi(s) is 1 if the state s is adjacent to prototype pi, and is 0 otherwise. In turn, tuning parameters include a, which is a learning rate parameter, and which may be between 0 to 1, to indicate how fast the model is set to learn. In turn, γ is the discount rate, between 0 to 1, indicating how important past rewards are valued.

The approximate Q-value, Q^(s,a), is given by the sum of all of the adjacent prototype values:

$$Q\hat{}(s,a)=\text{sum}(\theta(pi,a)\mu i(s)).$$

Kanerva coding allows a prototype to represent multiple adjacent states. When a state transition happens, all of the adjacent prototype values are updated, as well as Q-values of all of the adjacent state-action pairs. Please note that using Kanerva coding is optional and it is possible to build a RL system without using Kanerva coding.

The size of the prototype table and the distribution of the chosen prototypes in the full state space affect the performance of Kanerva coding. Two principles may be ensured: (1) no prototype is visited too often to prevent collisions, which are cases where too many states are adjacent to one prototype, and the prototype cannot distinguish among the different states; and (2) no prototype is visited too infrequently. To follow these two competing principles, an adaptive Kanerva coding technique is employed to dynamically update the prototype table.

In an embodiment, the prototype table may first be randomly initialized. To this end, given a prototype table size k, all entries are randomly selected from the full state space. Each entry in the prototype table maintains a counter called nVisit, to count its visit frequency. When an observed state results in a miss in the prototype table, i.e., no adjacent prototype is found, a new state is inserted into the table as a new prototype. An existing prototype that has the smallest nVisit count is replaced.

To avoid a situation in which a prototype table has a few very active or hot prototypes and other rarely visited prototypes, embodiments may further seek to remove such rarely visited prototypes. To this end, the prototype table may implement an update rule enforced by a prototype table update rate. At the beginning of each update period, each prototype has a probability pr=exp(−nVisit) of being deleted. To fill the prototype table back, the most visited prototypes are split into multiple adjacent prototypes by randomly incrementing the value of one of the attributes. This approach periodically cleans up the infrequently accessed or cold prototypes, and splits up the hot prototypes, such that the prototype table can cover the state space in an efficient way at runtime.

Online reinforcement learning in accordance with an embodiment leverages an off-policy temporal difference method, Q-learning, to learn an optimal control policy at runtime for fine-grained DVFS power management. The procedure, described further below in the pseudo code of Table 2 (and in FIG. 23), may be used to perform online learning and online prediction processes. First, the algorithm initializes relevant learning parameters and the prototype table in Kanerva coding. Then it iterates in a 3-step loop, where Step 1 completes the prediction process by selecting a VF level based on the current policy; Step 2 facilitates the learning process by updating relevant values with the sensed reward; and Step 3 improves the quality of learning by updating the prototype table.

TABLE 2

Initialize: state space with n selected attributes in a state
Initialize: action space with m VF levels
Initialize: prototype table of size k, with random prototypes
Initialize: all θ-values ← 0
Initialize: s ← s0, a ← a0
Initialize: γ ← 0.95, α ← 0.1, ε ← 0.05
for each learning step do:
  <Step 1: select a VF level using ε-greedy policy>
  if random value < ε then
      a ← VF (random)
  else
      a ← a'; a' is the VF with max $\hat{Q}(s, a')$
  observe reward r, next state s'
  <Step 2: update θ-values with Q-learning>
  $\hat{Q}(s, a)$ ← sum( θ(pi, a)μi(s) )
  θ(pi, a) ← (1 − α)θ(pi, a) + μi(s)α(r + γ · max$\hat{Q}(s', a')$)
  <Step 3: update the prototype table in Kaverna Coding>
  increment nVisit for the hit entries in table and update θ of hit entries
  if state s miss in prototype table, then
      insert s into entry of prototype table
      delete a least frequently used prototype entry of prototype table
  end
  if at a prototype update period, then
      delete a prototype entry with a probability of exp(−nVisit)
      split a prototype entry with max(nVisit) to fill up the prototype table
  end
  s ← s'

Figure 23:
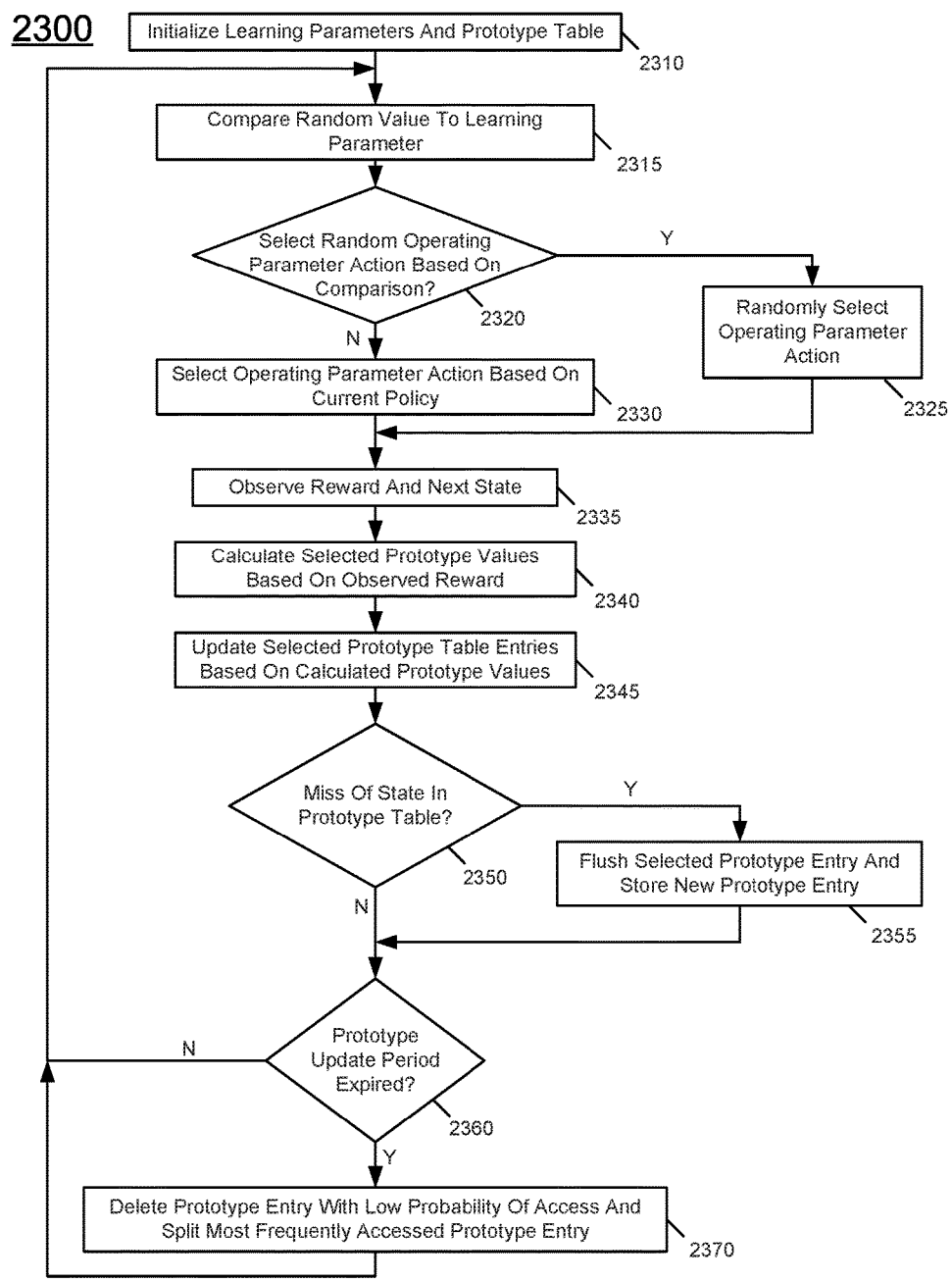
FIG. 23 is a flow diagram of a reinforcement learning method in accordance with an embodiment.

Referring now to FIG. 23, shown is a flow diagram of a reinforcement learning method in accordance with an embodiment. As shown in FIG. 23, method 2300 may be implemented at least in part by a RL logic as discussed above, and may implement the pseudo-code of Table 2. To this end, the RL logic may execute on a processor core, microcontroller or other programmable hardware to perform the described method.

As illustrated, method 2300 begins by initializing learning parameters and a prototype table (block 2310). Note that these learning parameters may be set according to a desired use case to control the amount of learning aggressiveness. Regarding the prototype table, this table can be initialized with a size of K entries, with each entry provided with random prototypes (or zero values) for the initialization process.

After initialization is completed, control passes to block 2315 during normal execution where a loop begins for a given operating interval. At the start of this loop, a random value can be compared to a given learning parameter, e.g., a sigma value. In the example of Table 2, where this sigma value is set at 0.05, it can be determined whether the random number is less than this learning parameter value. In an embodiment, a true random number generator or a pseudo random number generator of a processor may generate this random value. In an embodiment, the random number may be generated within particular bounds, e.g., between 0 and 1. At diamond 2320 it can be determined whether a random operating parameter action is to be selected. This determination may be based on the above comparison of the random value to the learning parameter. As an example, assuming that the random value is less than the learning parameter value, a random operating parameter action may be selected.

If such random operating parameter action is selected, control passes to block 2325, where the RL logic can randomly select the operating parameter action. This random action may include a random selection of any possible operating voltage-frequency pair. Understand that by this random selection, processor performance and power management may not be optimal. Nonetheless, such random selection may occur to enable improved learning.

Otherwise if a random operating parameter action is not selected, control passes to block 2330 where an operating parameter action may be selected based on a current power management policy. This current power management policy may be as implemented in a PM model of a power controller. As such, for the more typical operating intervals, an appropriate and updated (based on reinforcement learning) operating parameter selection may occur.

Still referring to FIG. 23, next control passes to block 2335 where the RL logic can observe a reward and next state based on this updated action. Note that the reward may, in a given embodiment, correspond to a power or energy consumption measurement for an evaluation interval, and the next state may include performance monitoring and other information obtained during the evaluation interval. Next at block 2340 selected prototype values can be calculated based on this observed reward. These selected prototype values may be the prototype value for the given state, as well as one or more adjacent prototype values. Thereafter at block 2345 the selected prototype table entries can be updated based on the calculated prototype values.

Still with reference to FIG. 23 it can be determined at diamond 2350 whether the next state misses in the prototype table, meaning that no entry is present in the prototype table for the state. If this is the case, control passes to block 2355 where a selected entry of the prototype table can be flushed and a new prototype entry stored. In an embodiment, flushing this entry may include storing the information of the entry to a further portion of a memory hierarchy.

From both of diamond 2350 and block 2355 control passes to diamond 2360, where it is determined whether a prototype update period has expired. Note that this prototype update period may correspond to a large number of evaluation intervals. Although the scope of the present invention is not limited in this regard, in embodiments this prototype update period may be between 10 million and 100 million machine cycles.

If it is determined that the prototype update period has expired, control passes to block 2370 where a given prototype entry may be deleted. More specifically, this entry may be a given entry with a low probability of access. Next, a most frequently accessed prototype entry can be split into two separate entries, to improve reinforcement learning and effectiveness of the prototype table. Understand while shown at this high level in the embodiment of FIG. 23, many variations and alternatives are possible.

Figure 24:
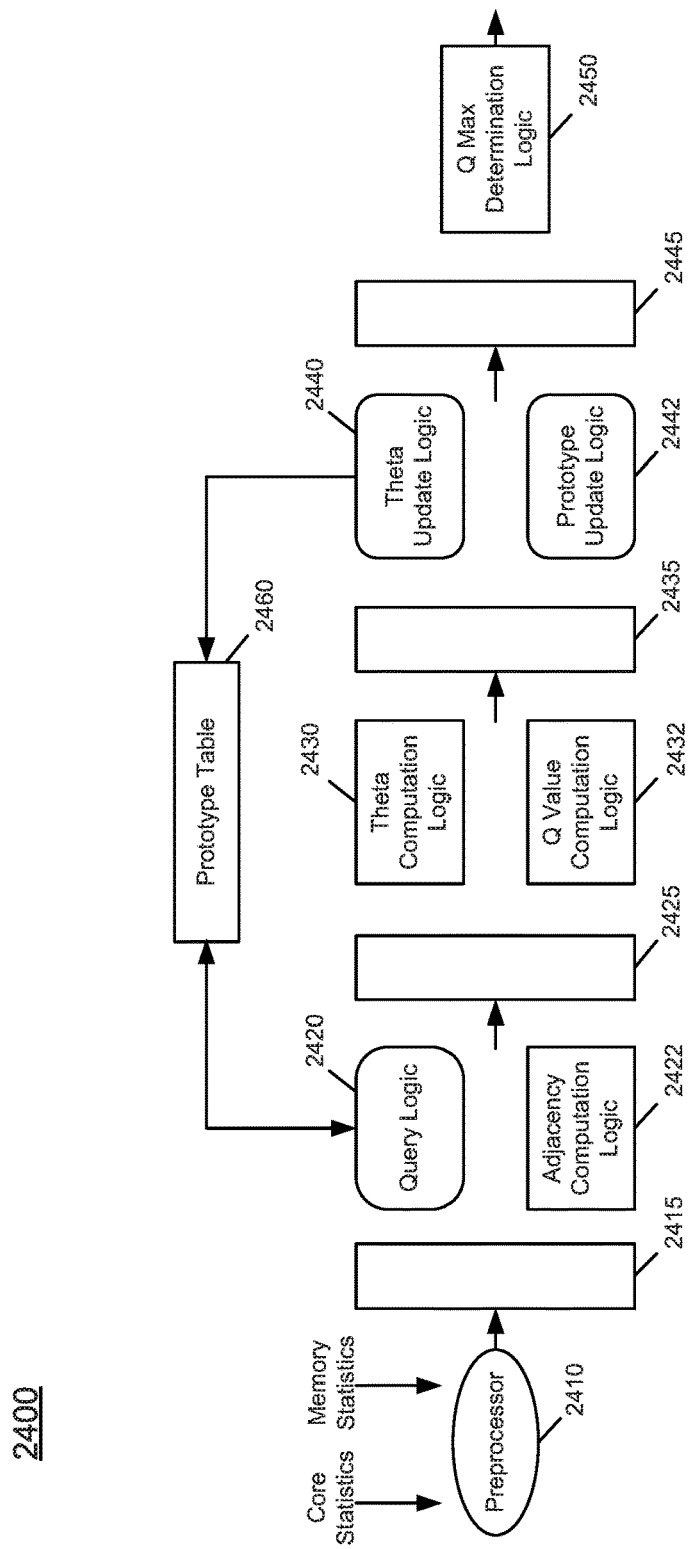
FIG. 24 is a block diagram of a reinforcement learning hardware logic in accordance with an embodiment of the present invention.

Referring now to FIG. 24, shown is a block diagram of a reinforcement learning hardware logic in accordance with an embodiment of the present invention. More specifically, RL hardware logic 2400 may be implemented as a five-stage pipeline that performs various operations on incoming information (and which is separate from any processor core pipeline). In some cases, multiple instantiations of this hardware logic may be provided, each associated with a core of a multicore processor. As such, at least some cores may include or be associated with a given one of these RL hardware logics. As seen, various performance monitoring information, including a variety of core statistics and/or memory statistics may be provided to a preprocessor 2410. Preprocessor 2410 may preprocess such information, e.g., to select appropriate monitoring information corresponding to a given state and provide it through a hardware buffer 2415 to a query logic 2420 and an adjacency computation logic 2422. As seen, query logic 2420 is coupled to a prototype table 2460. In an embodiment, prototype table 2460 may be implemented as SRAM within a processor. In some cases, for reduced size, this prototype table can be limited to 64 entries, which may consume approximately 1 kB of space.

Based on the state information received, query logic 2420 can access one or more entries within prototype table 2460. Access of adjacent entries may be determined based at least in part on adjacency computation logic 2422. Information obtained from the table and computed adjacency information may be provided through a hardware buffer 2425 to a theta computation logic 2430 and a Q value computation logic 2432. Such logics may compute appropriate theta and Q values based on the received inputs. The completed values may be provided through a hardware buffer 2435 to a theta update logic 2440 and a prototype update logic 2442. Such logics may appropriately update one or more entries within prototype table 2460 based on the computed values. As further seen, these computed values may be provided through a hardware buffer 2445 to a Q max determination logic 2450, which may determine a Q max value for a given state and prototype values to enable corresponding operating parameters to be provided to control operation of the processor.

Thus as shown in FIG. 24, RL logic 2400 may be implemented as a hardware control unit that is fully pipelined at a processor core clock frequency, in an embodiment. RL logic 2400 may be divided into a 5-stage pipeline, where stage-1 is used to sense and discretize attributes from the system; stage-2 is used to query values and compute adjacency; stage-3 and stage-4 are used to update $\theta$-value and the prototype table in parallel; and the final stage-5 is used to calculate the maximum $Q^{\wedge}$ value, so that a VF level can be selected. Note that only the last stage generates a prediction to be finished within one step, while all other stages can be executed over multiple steps to complete the learning process, and thus are not on the critical path. Understand while shown at this high level in the embodiment of FIG. 24, many variations and alternatives are possible.

The following examples pertain to further embodiments.

In one example, a processor comprises: a plurality of cores; and a power controller coupled to the plurality of cores. The power controller may include: a first logic to receive performance monitoring information from at least some of the plurality of cores and determine, according to a power management model, a performance state for one or more of the plurality of cores based on the performance monitoring information; and a second logic to receive the performance monitoring information from the at least some of the plurality of cores and dynamically update the power management model according to a reinforcement learning process.

In an example, the second logic comprises a preprocessor to receive the performance monitoring information and generate a vector having a plurality of attributes obtained from the performance monitoring information.

In an example, the second logic may further comprise a first calculation logic to calculate a prototype value for a current performance state of the processor based at least in part on a stored prototype value and a power consumption level at the current performance state, and a sum of adjacent prototype values.

In an example, the second logic further comprises a second calculation logic to calculate the sum of adjacent performance values.

In an example, the processor further comprises a first table having a first plurality of entries each to store a prototype, each of the first plurality of entries including a prototype value for each of a plurality of performance states and a counter to count a number of accesses to the entry.

In an example, the prototype comprises a vector of attributes, each of the attributes obtained from the performance monitoring information.

In an example, the vector of attributes comprises a subset of the performance monitoring information.

In an example, the second logic comprises a preprocessor to receive the performance monitoring information comprising core statistic information and memory statistic information, and select the subset of the performance monitoring information therefrom.

In an example, the second logic further comprises a determination logic to determine the performance state for the one or more of the plurality of cores based on a maximum Q value.

In an example, the second logic is to cause the first logic to update the performance state for the one or more of the plurality of cores randomly for a first portion of evaluation intervals and according to the power management model for a remaining portion of the evaluation intervals.

In an example, the second logic comprises a multi-stage hardware pipeline, the multi-stage hardware pipeline separate from hardware pipelines of the plurality of cores.

In an example, at least some of the plurality of cores comprise the second logic to receive the performance monitoring information from the corresponding core.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: randomly selecting an operating parameter action to cause a performance state change to a processor, according to a learning parameter value of a reinforcement learning logic of the processor; observing a system state and a power consumption value of the processor, based on the random operating parameter action; calculating one or more prototype values based at least in part on the observed power consumption value; and dynamically updating a power management model of the processor based on the one or more calculated prototype values.

In an example, the method further comprises randomly selecting the operating parameter action responsive to comparison of a random value to the learning parameter value.

In an example, the method further comprises selecting an operating parameter action from the power management model, if the random value exceeds the learning parameter value.

In an example, the method further comprises dynamically updating the power management model based at least in part on an update to one or more entries of a prototype table of the reinforcement learning logic.

In an example, the method further comprises flushing a selected entry of the prototype table and storing a new entry in the prototype table when a prototype does not hit in the prototype table.

In an example, the method further comprises deleting an entry of the prototype table based on a probability of access, and creating a new entry in the prototype table based on a most frequently accessed entry of the prototype table.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor having a plurality of cores, a power controller to control operating parameters for the plurality of cores based on a power management model, and a first logic to receive performance monitoring information from at least some of the plurality of cores and dynamically update the power management model according to a reinforcement learning process based at least in part on the performance monitoring information and observed power consumption information of the processor. The system may further include a voltage regulator coupled to the processor, where the power controller is to instruct the voltage regulator to provide at least one operating voltage to the processor.

In an example, the first logic is to randomly select one or more of the operating parameters, observe a system state and the power consumption information based on the random selection of the one or more of the operating parameters, calculate one or more prototype values based at least in part on the observed power consumption information, and dynamically update the power management model based on the calculated one or more prototype values.

In an example, the first logic is to randomly select the one or more operating parameters responsive to a first result of a comparison between a random value and a learning parameter value of the reinforcement learning process, and select the one or more operating parameters from the power management model responsive to a second result of the comparison.

In an example, the operating parameters of the plurality of cores comprises selection of a first number of the plurality of cores to be active and a second number of the plurality of cores to be in a low power state.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores; and
a power controller coupled to the plurality of cores, the power controller including:
a first hardware logic to receive performance monitoring information from at least some of the plurality of cores and determine, according to a power management model, a performance state for one or more of the plurality of cores based on the performance monitoring information and communicate digital information to at least one voltage regulator to cause the at least one voltage regulator to provide an updated voltage for the performance state to the one or more of the plurality of cores; and a second hardware logic to receive the performance monitoring information from the at least some of the plurality of cores and dynamically update the power management model according to a reinforcement learning process, wherein the second hardware logic is to cause the first hardware logic to update the performance state for the one or more of the plurality of cores randomly for a first portion of evaluation intervals and according to the power management model for a remaining portion of the evaluation intervals.

2. The processor of claim 1, wherein the second hardware logic comprises a preprocessor to receive the performance monitoring information and generate a vector having a plurality of attributes obtained from the performance monitoring information.

3. The processor of claim 2, wherein the second hardware logic further comprises a first calculation logic to calculate a prototype value for a current performance state of the processor based at least in part on a stored prototype value and a power consumption level at the current performance state, and a sum of adjacent prototype values.

4. The processor of claim 3, wherein the second hardware logic further comprises a second calculation logic to calculate the sum of adjacent prototype values.

5. The processor of claim 2, further comprising a first table having a first plurality of entries each to store a prototype, each of the first plurality of entries including a prototype value for each of a plurality of performance states and a counter to count a number of accesses to the entry.

6. The processor of claim 5, wherein the prototype comprises a vector of attributes, each of the attributes obtained from the performance monitoring information.

7. The processor of claim 6, wherein the vector of attributes comprises a subset of the performance monitoring information.

8. The processor of claim 7, wherein the second hardware logic comprises a preprocessor to receive the performance monitoring information comprising core statistic information and memory statistic information, and select the subset of the performance monitoring information therefrom.

9. The processor of claim 2, wherein the second hardware logic further comprises a determination logic to determine the performance state for the one or more of the plurality of cores based on a maximum Q value.

10. The processor of claim 1, wherein the second hardware logic comprises a multi-stage hardware pipeline, the multi-stage hardware pipeline separate from hardware pipelines of the plurality of cores.

11. The processor of claim 1, wherein at least some of the plurality of cores comprise the second hardware logic to receive the performance monitoring information from at least the corresponding core.

12. A non-transitory machine-readable medium having stored thereon data, which if used by at least one machine, causes the at least one machine to fabricate at least one integrated circuit to perform a method comprising:
   randomly selecting an operating parameter action to cause a performance state change to a processor, according to a learning parameter value of a reinforcement learning logic of the processor;
   digitally communicating with one or more voltage regulators to update at least one voltage to cause the performance state change to the processor;
   observing a system state and a power consumption value of the processor, based on the random operating parameter action;
   calculating one or more prototype values based at least in part on the observed power consumption value; and
   dynamically updating a power management model of the processor based on the one or more calculated prototype values.

13. The non-transitory machine-readable medium of claim 12, wherein the method further comprises randomly selecting the operating parameter action responsive to comparison of a random value to the learning parameter value.

14. The non-transitory machine-readable medium of claim 13, wherein the method further comprises selecting an operating parameter action from the power management model, if the random value exceeds the learning parameter value.

15. The non-transitory machine-readable medium of claim 12, wherein the method further comprises dynamically updating the power management model based at least in part on an update to one or more entries of a prototype table of the reinforcement learning logic.

16. The non-transitory machine-readable medium of claim 15, wherein the method further comprises flushing a selected entry of the prototype table and storing a new entry in the prototype table when a prototype does not hit in the prototype table.

17. The non-transitory machine-readable medium of claim 15, wherein the method further comprises deleting an entry of the prototype table based on a probability of access, and creating a new entry in the prototype table based on a most frequently accessed entry of the prototype table.

18. A system comprising:
   a processor having a plurality of cores, a power controller to control operating parameters for the plurality of cores based on a power management model, and a first hardware logic to receive performance monitoring information from at least some of the plurality of cores and dynamically update the power management model according to a reinforcement learning process based at least in part on the performance monitoring information and observed power consumption information of the processor, wherein the first hardware logic is to randomly select one or more of the operating parameters, observe a system state and the power consumption information based on the random selection of the one or more of the operating parameters, calculate one or more prototype values based at least in part on the observed power consumption information, and dynamically update the power management model based on the calculated one or more prototype values; and
   a voltage regulator coupled to the processor, wherein the power controller is, based on the dynamically updated power management model, to digitally instruct the voltage regulator to provide at least one operating voltage to the processor.

19. The system of claim 18, wherein the first hardware logic is to randomly select the one or more operating parameters responsive to a first result of a comparison between a random value and a learning parameter value of the reinforcement learning process, and select the one or more operating parameters from the power management model responsive to a second result of the comparison.

20. The system of claim 18, wherein the operating parameters of the plurality of cores comprises selection of a first number of the plurality of cores to be active and a second number of the plurality of cores to be in a low power state.

* * * * *